(12) United States Patent
Agrawal et al.

(10) Patent No.: US 12,225,383 B2
(45) Date of Patent: Feb. 11, 2025

(54) DATA ROUTING BASED ON APPLICATION RESTRICTION DESIGNATION

(71) Applicant: Motorola Mobility LLC, Chicago, IL (US)

(72) Inventors: Amit Kumar Agrawal, Bangalore (IN); Gautham Natakala Prabhakar, Bangalore (IN); Ranjeet Gupta, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 501 days.

(21) Appl. No.: 17/709,697

(22) Filed: Mar. 31, 2022

(65) Prior Publication Data
US 2023/0319574 A1 Oct. 5, 2023

(51) Int. Cl.
H04W 12/60 (2021.01)
H04L 67/141 (2022.01)
H04W 88/06 (2009.01)

(52) U.S. Cl.
CPC ........... H04W 12/60 (2021.01); H04L 67/141 (2013.01); H04W 88/06 (2013.01)

(58) Field of Classification Search
CPC ...... H04W 12/60; H04W 88/06; H04L 67/141
See application file for complete search history.

(56) References Cited

U.S. PATENT DOCUMENTS

| 7,020,460 | B1 | 3/2006 | Sherman et al. |
| 8,923,824 | B1 | 12/2014 | Masterman |
| 9,402,167 | B2 | 7/2016 | Barat et al. |
| 9,491,374 | B1 | 11/2016 | Avrahami et al. |
| 9,686,088 | B2 | 6/2017 | Papakipos et al. |
| 9,801,158 | B1 | 10/2017 | Yuan et al. |
| 10,147,141 | B1 | 12/2018 | Rixford |
| 10,387,098 | B2 | 8/2019 | Park et al. |
| 10,531,039 | B1 | 1/2020 | Bender et al. |
| 10,554,921 | B1 | 2/2020 | Lim et al. |
| 11,231,844 | B2 | 1/2022 | Steeves |
| 11,368,579 | B1 | 6/2022 | Palanivel |
| 11,410,778 | B2 | 8/2022 | Ravindranathan et al. |

(Continued)

FOREIGN PATENT DOCUMENTS

| CN | 110234025 A | 9/2019 |
| WO | 2006108288 A1 | 10/2006 |

OTHER PUBLICATIONS

U.S. Appl. No. 17/395,405, "Notice of Allowance", U.S. Appl. No. 17/395,405, filed May 10, 2023, 9 pages.

(Continued)

Primary Examiner — Duc C Ho
(74) Attorney, Agent, or Firm — FIG. 1 Patents

(57) ABSTRACT

In aspects of data routing based on application restriction designation, applications of a computing device can be designated as restricted applications to utilize secure network data or as unrestricted applications to utilize unsecure network data. A first data sharing session is connected over an unsecure wireless network for an unrestricted application executing on the computing device. In response to detecting a restricted application executing on the computing device, a second data sharing session is connected which causes a mobile device to provide cellular data to the computing device over a secure cellular network.

20 Claims, 14 Drawing Sheets

(56) References Cited

U.S. PATENT DOCUMENTS

| | | |
|---|---|---|
| 11,583,760 B1 | 2/2023 | Agrawal et al. |
| 11,641,440 B2 | 5/2023 | Agrawal et al. |
| 11,720,237 B2 | 8/2023 | Meirhaeghe et al. |
| 11,902,936 B2 | 2/2024 | Desai et al. |
| 12,101,832 B2 | 9/2024 | Snow et al. |
| 2003/0061611 A1 | 3/2003 | Pendakur |
| 2006/0112349 A1 | 5/2006 | Clow et al. |
| 2007/0101293 A1 | 5/2007 | Cherry et al. |
| 2007/0112926 A1 | 5/2007 | Brett et al. |
| 2007/0124507 A1 | 5/2007 | Gurram et al. |
| 2008/0177844 A1 | 7/2008 | McCarthy et al. |
| 2008/0250408 A1 | 10/2008 | Tsui et al. |
| 2009/0204881 A1 | 8/2009 | Murthy et al. |
| 2012/0050183 A1 | 3/2012 | Lee |
| 2012/0226742 A1 | 9/2012 | Momchilov et al. |
| 2012/0289203 A1 | 11/2012 | Santo et al. |
| 2013/0100017 A1 | 4/2013 | Papakipos et al. |
| 2014/0006634 A1 | 1/2014 | Eacott et al. |
| 2014/0098038 A1 | 4/2014 | Paek et al. |
| 2014/0192137 A1 | 7/2014 | Kim et al. |
| 2014/0277843 A1 | 9/2014 | Langlois et al. |
| 2014/0280578 A1 | 9/2014 | Barat et al. |
| 2014/0320398 A1 | 10/2014 | Papstein |
| 2014/0349757 A1 | 11/2014 | Nogami et al. |
| 2015/0110255 A1 | 4/2015 | Williams et al. |
| 2015/0237598 A1 | 8/2015 | Yoshitomi et al. |
| 2015/0365820 A1 | 12/2015 | White et al. |
| 2016/0210011 A1 | 7/2016 | Ho |
| 2016/0227278 A1 | 8/2016 | Bugajski et al. |
| 2016/0283063 A1 | 9/2016 | Missig et al. |
| 2016/0285974 A1 | 9/2016 | Shurtleff et al. |
| 2017/0078428 A1 | 3/2017 | Unter Ecker |
| 2017/0277498 A1 | 9/2017 | Wood, Jr. et al. |
| 2017/0353569 A1 | 12/2017 | Kozma et al. |
| 2019/0132903 A1 | 5/2019 | Suxena |
| 2019/0156788 A1 | 5/2019 | Lee et al. |
| 2019/0182113 A1 | 6/2019 | Alam et al. |
| 2019/0191214 A1 | 6/2019 | Mandavilli et al. |
| 2019/0294268 A1 | 9/2019 | Koyama et al. |
| 2019/0378519 A1 | 12/2019 | Dunjic et al. |
| 2020/0099545 A1 | 3/2020 | Hong et al. |
| 2020/0167699 A1 | 5/2020 | Cohen |
| 2020/0201615 A1* | 6/2020 | Biswas ............... G06F 21/53 |
| 2020/0356243 A1 | 11/2020 | Meyer et al. |
| 2020/0356254 A1 | 11/2020 | Missig et al. |
| 2021/0084556 A1 | 3/2021 | Gunnalan et al. |
| 2021/0097208 A1 | 4/2021 | Donahue et al. |
| 2021/0181922 A1 | 6/2021 | Chang et al. |
| 2021/0211902 A1 | 7/2021 | Achyuth et al. |
| 2021/0248483 A1 | 8/2021 | Tomasik et al. |
| 2021/0274416 A1 | 9/2021 | Jendli et al. |
| 2021/0349627 A1 | 11/2021 | Chang et al. |
| 2022/0070371 A1 | 3/2022 | Bushman et al. |
| 2022/0070389 A1 | 3/2022 | Tangeland et al. |
| 2022/0239785 A1 | 7/2022 | Daniel Marcelino Barbeira et al. |
| 2022/0391647 A1 | 12/2022 | Shi et al. |
| 2023/0041046 A1 | 2/2023 | Agrawal et al. |
| 2023/0045005 A1 | 2/2023 | Meirhaeghe et al. |
| 2023/0063665 A1 | 3/2023 | Snow et al. |
| 2023/0067649 A1 | 3/2023 | Desai et al. |
| 2023/0085250 A1 | 3/2023 | Agrawal et al. |
| 2023/0319575 A1 | 10/2023 | Agrawal et al. |
| 2024/0114482 A1 | 4/2024 | Desai et al. |
| 2024/0283826 A1* | 8/2024 | Ganguli ............. H04L 63/0281 |

OTHER PUBLICATIONS

U.S. Appl. No. 17/395,405, "Supplemental Notice of Allowability", U.S. Appl. No. 17/395,405, filed Jun. 28, 2023, 7 pages.
U.S. Appl. No. 17/395,405, "Supplemental Notice of Allowability", U.S. Appl. No. 17/395,405, filed Jul. 10, 2023, 15 pages.
U.S. Appl. No. 17/397,002, "Non-Final Office Action", U.S. Appl. No. 17/397,002, filed Aug. 3, 2022, 25 pages.
U.S. Appl. No. 17/473,384, "Non-Final Office Action", U.S. Appl. No. 17/473,384, filed Oct. 6, 2022, 14 pages.
U.S. Appl. No. 17/473,312, "Corrected Notice of Allowability", U.S. Appl. No. 17/473,312, filed Jul. 17, 2024, 3 pages.
"Auto Hotspot, How to | Samsung Galaxy S10 Plus", YouTube Video uploaded by Omarr Ghafoor [online][retrieved Jun. 23, 2021]. Retrieved from the Internet <https://www.youtube.com/watch?v=2V6s31zA7p4>., Oct. 30, 2019, 4 Pages.
"Check your phone's notifications in Samsung DeX", Samsung Electronics America, Inc. [retrieved Jul. 16, 2021]. Retrieved from the Internet <https://www.samsung.com/us/support/answer/ANS00062702/>., 2019, 3 Pages.
"Do you know about Auto Hotspot?", Samsung [retrieved Jun. 23, 2021]. Retrieved from the Internet <https://r2.community.samsung.com/t5/Tech-Talk/Do-you-know-about-Auto-Hotspot/td-p/2967111>., Dec. 4, 2019, 5 Pages.
"How do you automatically activate Mobile hotspot via Bluetooth connection on Windows 10 Mobile?", in: Windows Central Forums [online][retrieved Jul. 12, 2021]. Retrieved from the Internet <https://forums.windowscentral.com/ask-question/452584-how-do-you-automatically-activate-mobile-hotspot-via-bluetooth-connection-windows-10-mobile.html>., Feb. 19, 2017, 11 Pages.
"Instant Hotspot on your Mac", Apple Inc. [retrieved Jun. 23, 2021]. Retrieved from the Internet <https://support.apple.com/guide/macbook-air/instant-hotspot-apdae69c81f1/mac>., Feb. 2019, 2 Pages.
"Non-Final Office Action", U.S. Appl. No. 17/395,405, filed Dec. 27, 2021, 21 pages.
"Setting up Auto Hotspot on my Samsung phone", Samsung [retrieved Jun. 23, 2021]. Retrieved from the Internet <https://www.samsung.com/au/support/mobile-devices/setup-auto-hotspot/>., Oct. 20, 2020, 8 Pages.
Pratik , "How to Use Your Phone as a Drawing Pad for PC", TechWiser Blog [online][retrieved Jun. 8, 2021]. Retrieved from the Internet <https://techwiser.com/use-phone-as-drawing-pad-for-pc/>., Jul. 15, 2020, 12 pages.
U.S. Appl. No. 17/395,405, "Final Office Action", U.S. Appl. No. 17/395,405, filed Jun. 22, 2022, 38 pages.
Agrawal, Amit Kumar , et al., "U.S. Application as Filed", U.S. Appl. No. 17/397,002, filed Aug. 9, 2021, 82 pages.
Agrawal, Amit Kumar , et al., "U.S. Application as Filed", U.S. Appl. No. 17/473,384, filed Sep. 13, 2021, 68 pages.
Bohn, Dieter , "Chromebook Instant Tethering expands beyond Google devices and phones", The Verge Blog, Vox Media, LLC. [online][retrieved Jun. 23, 2021]. Retrieved from the Internet <https://www.theverge.com/2019/2/4/18210378/chromebook-instant-tethering-android-mobile-hotspot-chrome-os-expansion>., Feb. 4, 2019, 6 Pages.
Cipriani, Jason , "How to use Apple's Instant Hotspot feature", CNET [online][retrieved Jun. 23, 2021]. Retrieved from the Internet <https://www.cnet.com/how-to/how-to-use-apples-instant-hotspot-feature/>., Feb. 7, 2019, 4 Pages.
Desai, Rahul Bharat, et al., "U.S. Application as Filed", U.S. Appl. No. 17/462,281, filed Aug. 31, 2021, 57 pages.
Heinisch, Christian , "HotSpot Automatic (free)", Google Play [retrieved Jul. 12, 2021]. Retrieved from the Internet <https://play.google.com/store/apps/details?id=de.christian_heinisch.hotspot.enablehotspot&hl=en_US&gl=US>., Jun. 7, 2018, 3 Pages.
Meirhaeghe, Olivier David, et al., "U.S. Application as Filed", U.S. Appl. No. 17/395,405, filed Aug. 5, 2021, 80 pages.
Russell, Brandon , "Galaxy S21 features wireless support for Samsung DeX on PC", XDA Developers Blog [online][retrieved Mar. 30, 2022]. Retrieved from the Internet <https://www.xda-developers.com/galaxy-s21-wireless-support-samsung-dex-on-pc/>., Feb. 5, 2021, 7 pages.
Snow, Jeffrey Thomas, et al., "U.S. Application as Filed", U.S. Appl. No. 17/473,312, filed Sep. 13, 2021, 48 pages.
Tappert, Charles C, et al., "Chapter 6—English Language Handwriting Recognition Interfaces", In: Text Entry Systems: Mobility, Accessibility, Universality, Morgan Kaugmann [retrieved Jun. 27, 2022]. Retrieved from the Internet <https://doi.org/10.1016/B978-012373591-1/50006-1>, 2007, pp. 123-137.
U.S. Appl. No. 17/395,405, filed Oct. 28, 2022 , "Non-Final Office Action", U.S. Appl. No. 17/395,405, filed Oct. 28, 2022, 39 pages.

(56) References Cited

OTHER PUBLICATIONS

U.S. Appl. No. 17/397,002, "Notice of Allowance", U.S. Appl. No. 17/397,002, filed Nov. 16, 2022, 9 pages.
U.S. Appl. No. 17/397,002, "Supplemental Notice of Allowability", U.S. Appl. No. 17/397,002, filed Jan. 19, 2023, 3 pages.
U.S. Appl. No. 17/473,312, "Notice of Allowance", U.S. Appl. No. 17/473,312, filed Jun. 6, 2024, 9 pages.
U.S. Appl. No. 17/462,281, "Notice of Allowability", U.S. Appl. No. 17/462,281, filed Oct. 12, 2023, 3 pages.
U.S. Appl. No. 17/462,281, "Notice of Allowance", U.S. Appl. No. 17/462,281, filed Sep. 14, 2023, 12 pages.
U.S. Appl. No. 17/473,312, "Non-Final Office Action", U.S. Appl. No. 17/473,312, filed Oct. 27, 2023, 24 pages.
U.S. Appl. No. 17/462,281, "Non-Final Office Action", U.S. Appl. No. 17/462,281, filed Apr. 26, 2023, 13 pages.
U.S. Appl. No. 17/473,384, "Notice of Allowance", U.S. Appl. No. 17/473,384, filed Feb. 24, 2023, 8 pages.
U.S. Appl. No. 17/473,384, "Supplemental Notice of Allowability", U.S. Appl. No. 17/473,384, filed Mar. 31, 2023, 2 pages.
GB2210269.3, "Combined Search and Examination Report", GB Application No. GB2210269.3, Feb. 27, 2023, 9 pages.
U.S. Appl. No. 17/473,312, "Final Office Action", U.S. Appl. No. 17/473,312, filed Feb. 22, 2024, 24 pages.
U.S. Appl. No. 17/709,726, "Restriction Requirement", U.S. Appl. No. 17/709,726, Oct. 21, 2024, 6 pages.

\* cited by examiner

DATA ROUTING BASED ON APPLICATION RESTRICTION DESIGNATION

BACKGROUND

Today's person is afforded a tremendous selection of devices that are capable of performing a multitude of tasks. For instance, laptops and tablet devices provide increased screen space for productivity and entertainment tasks. However, a local network connection (e.g., a wireless network connection) is often required to provide laptop and tablet users with network access. In addition to including functionality for connecting to a local network connection, smartphones often also include functionality to communicate with a cellular network distributed over a large geographical area to provide a smartphone user with network access anywhere within the geographical area. While individual instances of devices provide functionality for discrete sets of tasks, the ability for devices to intercommunicate with one another greatly expands available task options and operating environments. For instance, a particular mobile device, such as a smartphone, can serve as a wireless connectivity point (e.g., a wireless hotspot) to provide cellular network access to a different device, such as a laptop device or a tablet device.

Thus, in certain scenarios, users of a particular computing device, such as a laptop or tablet device, have wireless network access via a local network connection as well as cellular network access via the particular mobile device serving as the wireless connectivity point. In additional scenarios, users of a particular mobile device, such as a smartphone, have wireless network access via a local network connection as well as cellular network access via a direct connection to cellular network. In these scenarios, the user may wish to utilize cellular network access for certain tasks and utilize wireless network access for other tasks. However, in order to do so, extensive user interaction is typically required to manually switch back and forth between the wireless network access and the cellular network access.

BRIEF DESCRIPTION OF THE DRAWINGS

Aspects of data routing based on application restriction designation are described with reference to the following Figures. The same numbers may be used throughout to reference similar features and components that are shown in the Figures. Further, identical numbers followed by different letters reference different instances of features and components described herein.

DETAILED DESCRIPTION

Figure 1:
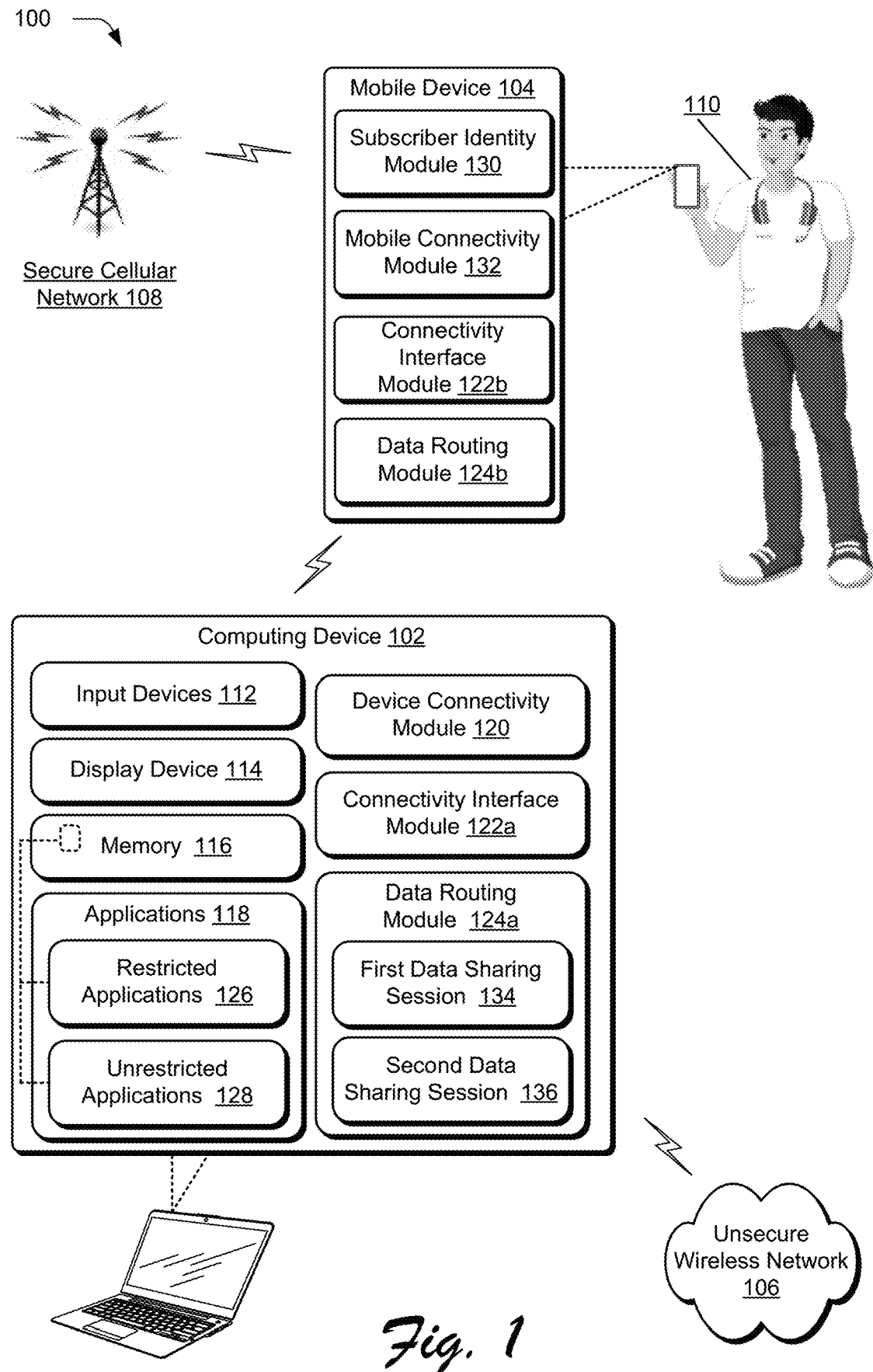
FIG. 1 illustrates an example environment in which aspects of data routing based on application restriction designation can be implemented.

Implementations of techniques for data routing based on application restriction designation are implemented as described herein. Generally, a first data sharing session may be established between a computing device and an unsecure wireless network, thus enabling network communications for the computing device over the unsecure wireless network. The unsecure wireless network, for instance, may be a public Wi-Fi network, for which security of network communications is often compromised. A second data sharing session is also established in which a mobile device is communicatively coupled to the computing device to provide cellular data to the computing device over a secure cellular network. In some aspects, the mobile device serves as a wireless network connectivity point (e.g., a wireless hotspot) to enable network communications for the computing device over the secure cellular network.

Accordingly, network access is enabled for the computing device over both the unsecure wireless network and the secure cellular network. Generally, the unsecure wireless network offers free and unlimited network data consumption, but the connection may be (and likely is) unsecure leaving a user susceptible to theft of sensitive personal information. Further, the secure wireless network offers increased security, but network data consumption is often limited—the user may be subjected to hefty fees for exceeding a network data consumption limit. Therefore, a user may wish to utilize either the first data sharing session over the unsecure wireless network or the second data sharing session over the secure cellular network depending on whether an application executing on the computing device is likely to communicate sensitive personal information over a connected network. However, in order to do so, extensive user interaction is typically required to manually switch back and forth between the unsecure wireless network and the secure cellular network.

Thus, in aspects of the described techniques, a data routing module is implemented to connect either the first data sharing session or the second data sharing session depending on whether a restricted application is executing on the computing device. Notably, the data routing module may be implemented at the computing device and/or the mobile device. Initially, applications of the computing device are designated as restricted applications or unrestricted applications. Restricted applications are configured to utilize network communications over the secure cellular network, while unrestricted applications are configured to utilize network communications over the unsecure wireless network.

In response to detecting an unrestricted application executing on the computing device, the data routing module initiates to connect the first data sharing session and disconnect the second data sharing session. As such, the data routing module enables network communications with the unsecure wireless network and disables network communications with the secure cellular network while the unrestricted application is executing on the computing device. In response to detecting a restricted application executing on the computing device, the data routing module initiates to connect the second data sharing session, which causes the mobile device to provide cellular data to the computing device over the secure cellular network. The data routing module also initiates to disconnect the first data sharing session. Accordingly, the data routing module enables network communications with the secure cellular network and disables network communications with the unsecure wireless network while the restricted application is executing on the computing device.

Notably, the data routing module initiates connecting/disconnecting the first and second data sharing session automatically and without user input. That is, the data routing module connects the first data sharing session and disconnects the second data sharing session without further user input apart from opening and interacting with an unrestricted application. Further, the data routing module connects the second data sharing session and disconnects the first data sharing session without further user input apart from opening and interacting with a restricted application. Accordingly, the techniques described herein seamlessly switch network connections between an unsecure wireless network and a secure cellular network provided by a communicatively coupled mobile device.

While features and concepts of the described techniques for data routing based on application restriction designation can be implemented in any number of different devices, systems, environments, and/or configurations, implementations of the techniques for data routing based on application restriction designation are described in the context of the following example devices, systems, and methods.

FIG. 1 illustrates an example environment 100 in which aspects of data routing based on application restriction designation can be implemented. The environment 100 includes a computing device 102 and a mobile device 104 that are interconnectable in various ways to enable the mobile device 104 to provide cellular data to the computing device 102. The computing device 102 and the mobile device 104, for instance, are interconnectable via one or more networks, such as the unsecure wireless network 106 and/or the secure cellular network 108. Additionally or alternatively, the computing device 102 and the mobile device 104 are interconnectable via direct inter-device connectivity, e.g., via direct wireless and/or wired connectivity between the computing device 102 and the mobile device 104. In this particular example, the computing device 102 represents a device, such as a laptop computer, a desktop computer, a tablet device, and so forth. The mobile device 104 represents a portable device that can be carried by a user 110, such as a smartphone. These examples are not to be construed as limiting, however, and the computing device 102 and/or the mobile device 104 can be implemented in a variety of different ways and form factors. Example attributes of the computing device 102 and the mobile device 104 are discussed below with reference to device 1400 of FIG. 14.

The computing device 102 includes various functionality that enables the computing device 102 to perform different aspects of data routing based on application restriction designation discussed herein, including input devices 112, a display device 114, memory 116, applications 118, a device connectivity module 120, a connectivity interface module 122a, and a data routing module 124a. Additionally, the computing device 102 is illustrated as connected to the unsecure wireless network 106, which, in some instances, may be a public Wireless Local Area Network (WLAN) (e.g., a public Wi-Fi network).

In one example, the unsecure wireless network 106 is an open Wi-Fi network that can be joined by anyone within range of the Wi-Fi network without entering a password (e.g., free public Wi-Fi at an airport). In another example, the unsecure wireless network 106 is a Wi-Fi network that is joinable with a common password that is shared with all guests of an establishment (e.g., a Wi-Fi password is available on a menu of a restaurant to all restaurant guests). In yet another example, the unsecure wireless network 106 is a Wi-Fi network that is joinable via a one-time password linked with a user's phone number and/or basic user data. One advantage of these public Wi-Fi networks is that they are free—network users have access to unlimited consumption of network data over the unsecure wireless network 106. However, one disadvantage of these public Wi-Fi networks is that they are often unsecure, making network users susceptible to theft of sensitive personal information.

The input devices 112 represent functionality for enabling input to the computing device 102, such as user input to invoke functionality of the computing device 102. The input devices 112 can be implemented in various ways, such as touch input, audible input (e.g., speech), a physical keyboard, and so forth.

The applications 118 represent functionality for performing different computing tasks via the computing device 102, such as gaming, media consumption (e.g., content streaming), productivity tasks (e.g., word processing, content generation, data analysis, etc.), financial tasks (e.g., sending or receiving payments, viewing bank statements), communication tasks (e.g., sending or receiving e-mails and/or messages), and so forth. The content of the applications is viewable by the user 110 on the display device 114 of the computing device 102. Some types of applications 118, such as financial applications (e.g., online banking applications, online payment applications) and communication applications (e.g., e-mail applications, messaging applications) often include sensitive personal information in network communications (e.g., with the unsecure wireless network 106). These types of applications 118 may be designated as restricted applications 126 to utilize secure network data. Other types of applications, such as gaming applications and media consumption applications (e.g., content streaming) often do not include sensitive personal information in network communications (e.g., with the unsecure wireless network 106). These types of applications may be designated as unrestricted applications 128 to utilize unsecure network data.

In other words, the computing device 102 is restricted from communicating with the unsecure wireless network 106 while executing the restricted applications 126. Additionally or alternatively, the computing device 102 is free to communicate with the unsecure wireless network 106 while executing the unrestricted applications 128. In implementations, a list of the restricted applications 126 and the unrestricted applications 128 are maintained as application designation data in memory 116 of the computing device 102.

The device connectivity module 120 represents functionality (e.g., logic and hardware) for enabling the computing device 102 to interconnect with other devices and/or networks, such as the mobile device 104 and the unsecure wireless network 106. The device connectivity module 120, for instance, enables wireless and/or wired connectivity of the computing device 102.

The connectivity interface module 122a represents functionality for enabling the computing device 102 to interface with other devices. As further discussed below, for instance, the connectivity interface module 122a enables the computing device 102 to establish wireless and/or wired data communication with other devices, e.g., the mobile device 104.

The mobile device 104 includes various functionality that enables the mobile device 104 perform different aspects of data routing based on application restriction designation discussed herein, including a subscriber identity module 130, a mobile connectivity module 132, a connectivity interface module 122b, and a data routing module 124b. The subscriber identity module 130 represents functionality to enable network data communications to the mobile device 104 via the secure cellular network 108, which may be a 3G, 4G, and/or 5G cellular network. For instance, the mobile device 104 includes the subscriber identity module 130 (SIM, or commonly referred to as a SIM card) or an embedded SIM (eSIM) designed to securely store SIM information. The SIM information may include an international mobile subscriber identity (IMSI) number and related security key associated with the user 110 of the mobile device 104. For example, the subscriber identity module 130 is used to identify and authenticate the device as a subscriber on the secure cellular network 108, and enables a subscription with a wireless network operator for wireless communication by the mobile device 104 using the secure cellular network 108 associated with the wireless network operator.

The mobile connectivity module 132 represents functionality (e.g., logic and hardware) for enabling the mobile device 104 to interconnect with other devices and/or networks, such as the computing device 102 and the secure cellular network 108. Generally, the computing device 102 and the mobile device 104 are configured to intercommunicate via a variety of different wireless protocols, such as wireless cellular (e.g., 3G, 4G, 5G), wireless broadband, Wireless Local Area Network (WLAN) (e.g., Wi-Fi), Wi-Fi Direct, wireless short distance communication (e.g., Bluetooth™ (including Bluetooth™ Low Energy (BLE)), Near Field Communication (NFC)), and so forth.

According to implementations for data routing based on application restriction designation, for example, the connectivity interface module 122b of the mobile device 104 interfaces with the connectivity interface module 122a of the computing device 102 to provide network connectivity (e.g., wireless and/or wired connectivity) to the computing device 102. For instance, and as detailed below, cellular network connectivity via the secure cellular network 108 is shared with the computing device 102 to provide the computing device 102 with cellular network access. In one or more implementations, the connectivity interface modules 122a, 122b represent functionality for the mobile device 104 to serve as a wireless connectivity point (e.g., a wireless hotspot) to provide cellular data to the computing device 102 via the secure cellular network 108. Therefore, the connectivity interface modules 122a, 122b provide the computing device 102 with access to the secure cellular network 108. One advantage of the secure cellular network 108 is that the network connection is secure—it is highly unlikely that network users of the secure cellular network 108 will be subjected to theft of personal information. However, one disadvantage of the secure cellular network 108 is that consumption of cellular data is limited—network users often pay for a limited amount of cellular data and are subjected to additional fees for additional consumption of cellular data beyond the limited amount.

Therefore, the data routing module 124a represents functionality to switch between a first network connection via the unsecure wireless network 106 and a second network connection via the secure cellular network 108 based on whether a restricted application 126 or an unrestricted application 128 is executing on the computing device 102. For example, the data routing module 124a can detect an unrestricted application 128 executing on the computing device 102, and in response, connect a first data sharing session 134 over the unsecure wireless network 106. Additionally or alternatively, the data routing module 124a can detect a restricted application 126 executing on the computing device, and in response, connect a second data sharing session 136 which causes the mobile device 104 to provide cellular data to the computing device 102 over the secure cellular network 108. Notably, the functionality of the data routing module 124a can be implemented at the computing device 102, as further discussed below with reference to FIG. 2. Additionally or alternatively, the functionality of the data routing module 124b can be implemented at the mobile device 104, as further discussed below with reference to FIG. 3.

By connecting the first data sharing session 134 over the unsecure wireless network 106 for unrestricted applications 128 executing on the computing device 102, the data routing module 124a, 124b enables the user 110 to take advantage of the free network data consumption offered by the unsecure wireless network 106. Moreover, since the unrestricted applications 128 often do not include sensitive personal information in network communications with the unsecure wireless network 106, the user 110 faces a reduced risk of theft of personal information. Furthermore, by connecting the second data sharing session 136 for restricted applications 126 executing on the computing device 102, the data routing module 124a, 124b enables the user to take advantage of the network security offered by the secure cellular network 108 for the applications 118 more likely to include sensitive personal information in network communications.

Having discussed an example environment in which the disclosed techniques can be performed, consider now some example scenarios and implementation details for implementing the disclosed techniques.

Figure 2:
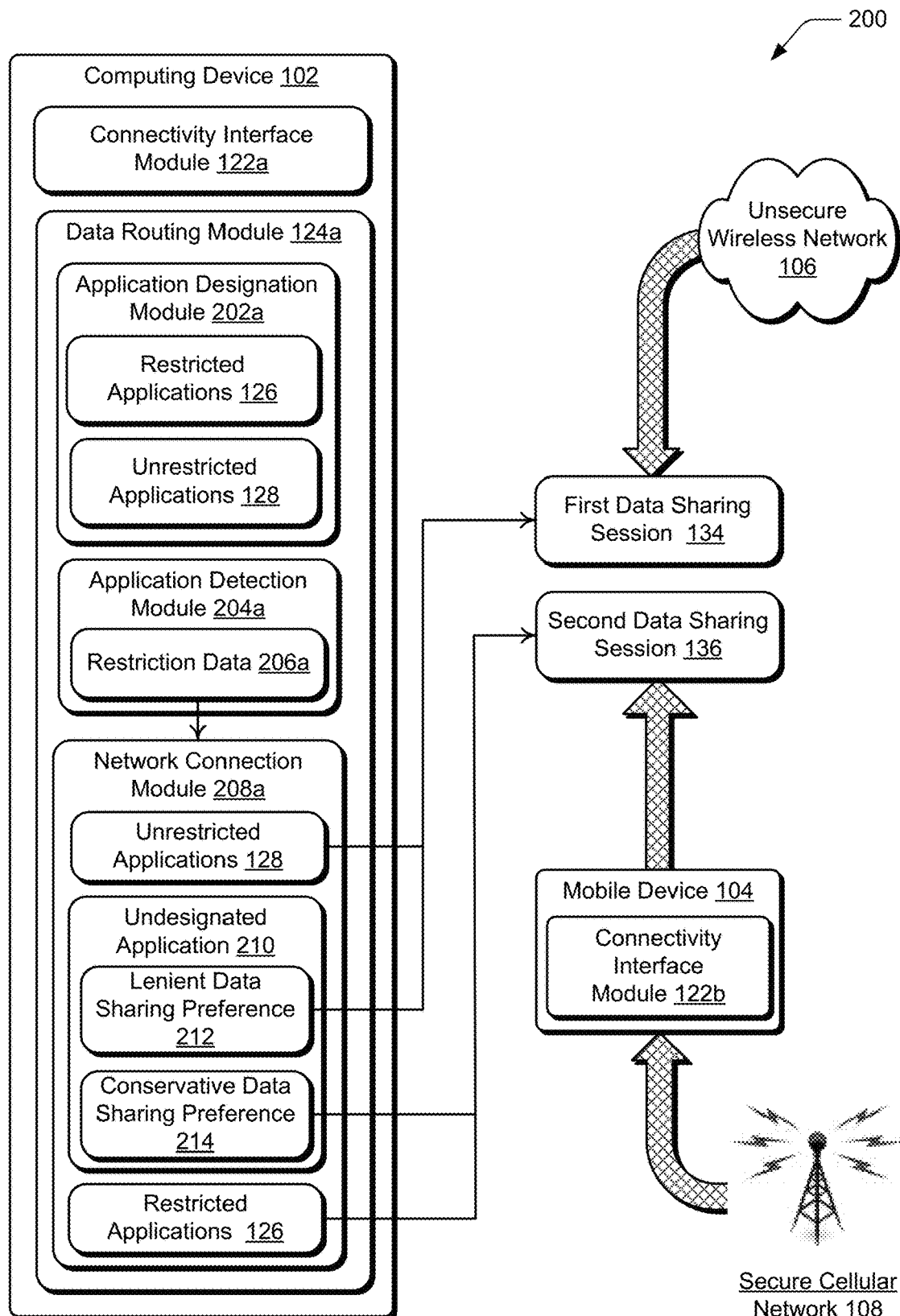
FIG. 2 depicts an example system in which aspects of data routing based on application restriction designation can be implemented by a computing device communicatively coupled to a mobile device in accordance with one or more implementations.

FIG. 2 depicts an example system 200 in which aspects of data routing based on application restriction designation can be implemented by a computing device communicatively coupled to a mobile device in accordance with one or more implementations. Generally, the system 200 can be implemented in the environment 100 and incorporates the attributes of the environment 100 introduced above.

In the system 200, a first data sharing session 134 is established over the unsecure wireless network 106. For example, the computing device 102 leverages the device connectivity module 120 to connect to a public Wi-Fi network. In some implementations, the data routing module 124a automatically determines that a connected network is unsecure and/or untrusted. For example, in response to connecting to a wireless network, the data routing module 124a, automatically and without user input, determines that the wireless network is a public Wi-Fi network and designates the wireless network as unsecure. Additionally or alternatively, in response to connecting to a wireless network that the computing device 102 has not previously connected, the data routing module 124a may display a user interface element prompting the user to designate the wireless network as secure or unsecure. Notably, a data sharing session may be maintained over a secure network connection (e.g., a home/work Wi-Fi network) regardless of whether a restricted application 126 or an unrestricted application 128 is executing on the computing device 102.

Furthermore, a second data sharing session 136 is established over the secure cellular network 108. For example, the connectivity interface module 122b of the mobile device 104 interfaces with the connectivity interface module 122a of the computing device 102 to provide the computing device 102 with cellular data over the secure cellular network 108. Therefore, two data sharing sessions are accessible by the computing device 102—a first data sharing session 134 via a direct connection to an unsecure wireless network 106 and a second data sharing session 136 provided by the mobile device 104 over the secure cellular network 108.

The data routing module 124a includes an application designation module 202a, which represents functionality to designate the applications 118 as either restricted applications 126 or unrestricted applications 128. In one or more implementations, the application designation module 202a automatically designates an application as restricted or unrestricted in response to the application being downloaded on the computing device 102. Notably, the designation of the application occurs without further input to designate the application (e.g., without further input apart from input to download the application). In accordance with the described techniques, the application designation module 202a automatically designates the applications 118 of the computing device 102 as restricted applications 126 or unrestricted applications 128 based on application metadata and/or listing information obtained from download sources associated with the applications 118. The download sources, for example, may be online application stores such as the Apple App Store °, the Google Play Store °, etc.

The applications 118 downloaded from these download sources often include application metadata to categorize the applications (e.g., as gaming applications, entertainment applications, communication applications, financial applications, etc.). The application designation module 202a leverages the application metadata to automatically designate the applications 118 as restricted applications 126 or unrestricted applications 128. By way of example, the application designation module 202a can designate applications categorized within an entertainment category as unrestricted applications 128. To do so, the application designation module 202a identifies an application as an entertainment application based on application category metadata of the application including key terms related to entertainment, such as "entertainment," "stream," "streaming," or any other suitable key term. Accordingly, the application designation module 202a can designate the entertainment application as an unrestricted application 128.

In another example, the application designation module 202a can designate applications categorized within a finance category as restricted applications 126. To do so, the application designation module 202a identifies an application as a financial application based on application category metadata of the application including key terms related to finances, such "finance," "financial," "bank," or any other suitable key term. As such, the application designation module 202a can designate the financial application as a restricted application 126. Applications of different application categories can be similarly identified and designated by the application designation module 202a without departing from the spirit or scope of the described techniques.

As mentioned above, the application designation module 202a can designate the applications 118 as restricted or unrestricted based on listing information obtained from the download sources. For example, application listings (e.g., as listed on a download source, such as an application store) often include an application description. In response to an application being downloaded, the application designation module 202a can search the application description included in the listing for key terms associated with a plurality of application categories in order to designate the application. For example, application designation module 202a can determine that an application is a financial application based on the application description including key terms relating to finances, such as "finance," "banking," and "transaction," and designate the application as a restricted application 126.

Additionally or alternatively, the application designation module 202a receives user input designating the restricted applications 126 and the unrestricted applications 128. For example, the application designation module 202a includes functionality for presenting a user interface that displays a list of downloaded applications and enables the user 110 to provide user input designating the applications as restricted applications 126 or unrestricted applications 128. Notably, the user 110 can provide user input to override an application designation made automatically by the application designation module 202a (e.g., based on application metadata and/or download source listing information). Additionally or alternatively, the user 110 can provide user input to designate an application that was not previously designated by the application designation module 202a (e.g., due to insufficient application metadata and download source listing information to designate the application). A list of the restricted applications 126 and the unrestricted applications 128 can be maintained as application designation data in memory 116 of the computing device 102.

The data routing module 124a further includes an application detection module 204a configured to detect execution of restricted applications 126, unrestricted applications 128, and/or applications that are not yet designated as restricted or unrestricted. For example, the application detection module 204a receives an indication of currently executing applications for comparison to the list of restricted applications 126 and the unrestricted applications 128 maintained in memory 116. Based on the comparison, the application detection module 204a can generate restriction data 206a that indicates one of the following: only restricted applications 126 are executing on the computing device 102, only unrestricted applications 128 are executing on the computing device 102, both restricted applications 126 and unrestricted applications 128 are executing on the computing device 102, or at least one application not yet designated as restricted or unrestricted is executing on the computing device 102.

The restriction data 206a is then passed as an input to a network connection module 208a, which represents functionality to connect either the first data sharing session 134 or the second data sharing session 136 based on the restriction data 206a. For example, if the restriction data 206a indicates that only unrestricted applications 128 are executing on the computing device 102, the network connection module 208a connects the first data sharing session 134 over the unsecure wireless network 106. For instance, the network connection module 208a leverages the device connectivity module 120 to cause the computing device 102 to connect to the unsecure wireless network 106. Furthermore, the network connection module 208a also disconnects the second data sharing session 136 based on the restriction data 206a indicating that only unrestricted applications 128 are executing on the computing device 102. For instance, the network connection module 208a prompts the connectivity interface module 122a of the computing device 102 to interface with the connectivity interface module 122b of the mobile device 104 to cause the mobile device 104 to no longer provide the cellular data to the computing device 102 over the secure cellular network 108. Accordingly, the computing device 102 is configured to utilize network communications with the unsecure wireless network 106 to facilitate execution of the unrestricted applications 128.

If the restriction data 206a indicates that only restricted applications 126 are executing on the computing device 102, the network connection module 208a connects the second data sharing session 136. To do so, the network connection module 208a prompts the connectivity interface module 122a of the computing device 102 to interface with the connectivity interface module 122b of the mobile device 104 to cause the mobile device 104 to provide cellular data to the computing device 102 over the secure cellular network 108. Further, the network connection module 208a also disconnects the first data sharing session 134 based on the restriction data 206a indicating that only restricted applications 126 are executing on the computing device 102. To do so, the network connection module 208a leverages the device connectivity module 120 to cause the computing device 102 to disconnect from the unsecure wireless network 106. Accordingly, the computing device 102 is configured to utilize network communications with the secure cellular network 108 to facilitate execution of the restricted applications 126.

If the restriction data 206a indicates that both restricted applications 126 and unrestricted applications 128 are executing on the computing device 102, the network connection module 208a is configured to default to the second data sharing session 136. In particular, the network connection module 208a connects the second data sharing session 136 causing the mobile device 104 to provide the cellular data to the computing device 102 over the secure cellular network 108 and disconnects the first data sharing session 134. In doing so, the computing device 102 is configured to utilize network communications with the secure cellular network 108 if at least one restricted application 126 is executing on the computing device 102.

Notably, the network connection module 208a facilitates connection of either the first data sharing session 134 or the second data sharing session 136 without user input to select the first data sharing session 134 or the second data sharing session 136. In other words, apart from user input to open and interact with an unrestricted application 128, the user 110 need not provide additional input to connect the first data sharing session 134 and disconnect the second data sharing session 136. Further, apart from user input to subsequently open and interact with a restricted application 126, the user 110 need not provide further input to connect the second data sharing session 136 and disconnect the first data sharing session 134. Accordingly, the user 110 does not need to manually connect the second data sharing session 136 and disconnect the first data sharing session 134 (e.g., via network management settings) each time a restricted application 126 is opened, and vice versa.

In one or more implementations, the restriction data 206a indicates an undesignated application 210 is executing on the computing device 102. An undesignated application 210 is an application that has not yet been designated as restricted or unrestricted. By way of example, there was insufficient application metadata and download source listing information to automatically designate the application, and user input was not received to designate the application. In accordance with these implementations, the data routing module 124a initially receives user input specifying one of a lenient data sharing preference 212 or a conservative data sharing preference 214. The lenient data sharing preference 212 indicates a user preference to utilize network communications via the unsecure wireless network 106 for an undesignated application 210 executing on the computing device 102. Further, the conservative data sharing preference 214 indicates a user preference to utilize network communications via the secure cellular network 108 for an undesignated application 210 executing on the computing device 102. Notably, data sharing preference data indicating either the lenient data sharing preference 212 or the conservative data sharing preference 214 may be maintained in memory 116 of the computing device 102.

If the data sharing preference data indicates a lenient data sharing preference 212, the network connection module 208a treats the undesignated application 210 as an unrestricted application 128. For instance, if the restriction data 206a indicates that the undesignated application 210 is executing on the computing device 102, the network connection module 208a connects the first data sharing session 134 over the unsecure wireless network 106 based on the lenient data sharing preference 212. In addition, the network connection module 208a disconnects the second data sharing session 136. Accordingly, the computing device 102 is configured to utilize network communications with the unsecure wireless network 106 to facilitate execution of the undesignated application 210 if the lenient data sharing preference 212 is specified.

In contrast, if the data sharing preference data indicates a conservative data sharing preference 214, the network connection module 208a treats the undesignated application 210 as a restricted application 126. For instance, if the restriction data 206a indicates that the undesignated application 210 is executing on the computing device 102, the network connection module 208a connects the second data sharing session 136 causing the mobile device 104 to provide the cellular data to the computing device 102 over the secure cellular network 108. In addition, the network connection module 208a disconnects the first data sharing session 134. Accordingly, the computing device 102 is configured to utilize network communications with the secure cellular network 108 to facilitate execution of the undesignated application 210 if the conservative data sharing preference 214 is specified.

In one or more implementations, the second data sharing session 136 is established automatically in response to a restricted application 126 executing on the computing device 102. In other words, the user need not manually enable cellular network communications to be routed between the computing device 102 and the secure cellular network 108 via the mobile device 104 (e.g., via an "enable hotspot" button). Rather, in response to receiving the restriction data 206a indicating that the restricted application 126 is executing on the computing device 102, the network connection module 208a automatically causes the connectivity interface module 122a of the computing device 102 to interface with the connectivity interface module 122b of the mobile device 104 to cause the mobile device 104 to provide the cellular data to the computing device 102 over the secure cellular network 108. Provided that a connection is available between the computing device 102 and the mobile device 104 (e.g., the devices are in range to enable a mobile hotspot or a wired connection is established between the devices), then the second data sharing session 136 is established and connected responsive to execution of the restricted application 126 being detected.

Figure 3:
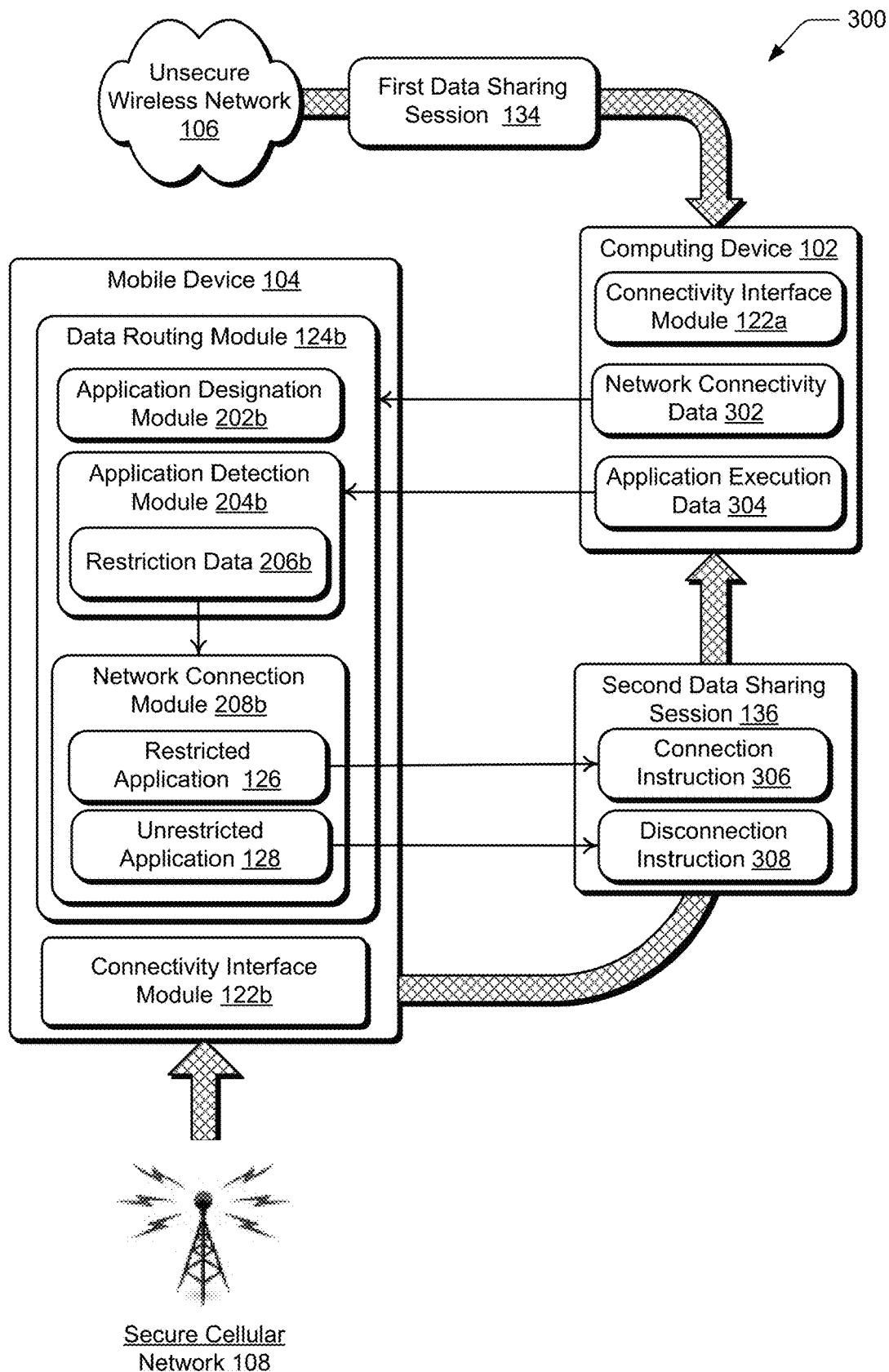
FIG. 3 depicts an example system in which aspects of data routing based on application restriction designation can be implemented by a mobile device communicatively coupled to a computing device in accordance with one or more implementations.

FIG. 3 depicts an example system 300 in which aspects of data routing based on application restriction designation can be implemented by a mobile device communicatively coupled to a computing device in accordance with one or more implementations. Generally, the system 300 can be implemented in the environment 100 and incorporates the attributes of the environment 100 introduced above. Further, the system 300 depicts functionality of the data routing module 124b as implemented by the mobile device 104, which operates in a similar manner to the data routing module 124a as implemented by the computing device 102. Accordingly, the data routing module 124b incorporates the attributes of the data routing module 124a discussed above with reference to FIG. 2.

In the system 300, a first data sharing session 134 is established between the computing device 102 and the unsecure wireless network 106. Network connectivity data 302 is then generated by the computing device 102 indicating that the first data sharing session 134 has been initiated by the computing device 102 over a wireless network. The network connectivity data 302 is received by the data routing module 124b and analyzed to determine whether the wireless network is an unsecure wireless network 106 or a secure wireless network. For example, the data routing module 124b automatically determines that the computing device 102 is connected to a public Wi-Fi network and designates the wireless network as unsecure. Additionally or alternatively, the data routing module 124b may display a user interface element (e.g., on a display device of the mobile device 104) prompting the user to designate the wireless network as secure or unsecure.

Further, a second data sharing session 136 is established between the computing device 102 and the secure cellular network 108. For example, the connectivity interface module 122b of the mobile device 104 interfaces with the connectivity interface module 122a of the computing device 102 to provide the computing device 102 with cellular data over the secure cellular network 108.

The data routing module 124b also includes an application designation module 202b, which represents functionality to designate the applications 118 of the computing device 102 as either restricted applications 126 or unrestricted applications 128. In some implementations, the application designation module 202b receives application designation data from the computing device 102 indicating the restricted applications 126 and the unrestricted applications 128. Additionally or alternatively, the application designation module 202b receives an indication of the applications 118 of the computing device 102 and designates the applications 118 as either restricted or unrestricted. For example, the application designation module 202b designates the applications 118 automatically based on application metadata and/or listing information obtained from download sources associated with the applications 118, or based on user input received to designate the applications 118, as further discussed above with reference to FIG. 2. A list of the restricted applications 126 and the unrestricted applications 128 can be maintained as application designation data in memory of the mobile device 104.

The data routing module 124b also includes an application detection module 204b configured to receive application execution data 304 from the computing device 102 indicating one or more applications 118 currently executing on the computing device 102. The application detection module 204b can compare the currently executing applications 118 to the list of restricted applications 126 and the unrestricted applications 128 maintained in memory of the mobile device 104. Based on the comparison, the application detection module 204b can generate restriction data 206b that indicates one of the following: only restricted applications 126 are executing on the computing device 102, only unrestricted applications 128 are executing on the computing device 102, both restricted applications 126 and unrestricted applications 128 are executing on the computing device 102, or at least one application not yet designated as restricted or unrestricted is executing on the computing device 102.

The restriction data 206b is passed as an input to a network connection module 208b, which represents functionality to connect and disconnect the second data sharing session 136 based on the restriction data 206b. For example, if the restriction data 206b indicates that a restricted application 126 is executing on the computing device 102, the network connection module 208b issues a connection instruction 306 which causes the mobile device 104 to connect the second data sharing session 136 to provide cellular data to the computing device 102 over the secure cellular network 108. For instance, the network connection module 208b prompts the connectivity interface module 122b of the mobile device 104 to interface with the connectivity interface module 122a of the computing device to provide the cellular data to the computing device 102 over the secure cellular network 108. In addition to causing connection of the second data sharing session 136, the connection instruction 306 further causes disconnection of the first data sharing session 134. For instance, the network connection module 208b can transmit a connection result of the connection instruction 306 to the computing device 102 indicating that the second data sharing session 136 has been connected and that the first data sharing session 134 is to be disconnected. In response to receiving the connection result, the computing device 102 can disconnect the first data sharing session 134.

If the restriction data 206b indicates that only unrestricted applications are executing on the computing device 102 (i.e., the restricted application 126 is no longer executing on the computing device 102), the network connection module 208b issues a disconnection instruction 308 which causes the mobile device 104 to disconnect the second data sharing session 136 to no longer provide cellular data to the computing device 102 over the secure cellular network 108. For instance, the network connection module 208b prompts the connectivity interface module 122b of the mobile device 104 to interface with the connectivity interface module 122a of the computing device 102 to no longer provide the cellular data to the computing device 102 over the secure cellular network 108. In addition to causing disconnection of the second data sharing session 136, the disconnection instruction 308 further causes connection of the first data sharing session 134. For instance, mobile device 104 can transmit a disconnection result of the disconnection instruction 308 to the computing device 102 indicating that the second data sharing session 136 has been disconnected and that the first data sharing session 134 is to be connected. In response to receiving the disconnection result, the computing device 102 can connect the first data sharing session 134.

In one or more implementations, the restriction data 206b indicates that an undesignated application is executing on the computing device 102. As further discussed above with reference to FIG. 2, the network connection module 208b can determine whether to issue the connection instruction 306 or the disconnection instruction 308 based on user input indicating either a lenient data sharing preference 212 or a conservative data sharing preference 214.

For example, if a conservative data sharing preference 214 is received, the network connection module 208b treats the undesignated application as a restricted application. As a result, the network connection module 208b issues the connection instruction 306 to initiate connecting the second data sharing session 136 and disconnecting the first data sharing session 134 if at least one undesignated application is executing on the computing device 102. Additionally or alternatively, if a lenient data sharing preference 212 is received, the network connection module 208b treats the undesignated application 210 as an unrestricted application 128. Accordingly, the network connection module 208b issues the disconnection instruction 308 to initiate disconnecting the second data sharing session 136 and connecting the first data sharing session 134 if only undesignated applications and/or unrestricted applications are executing on the computing device 102.

Figure 4:
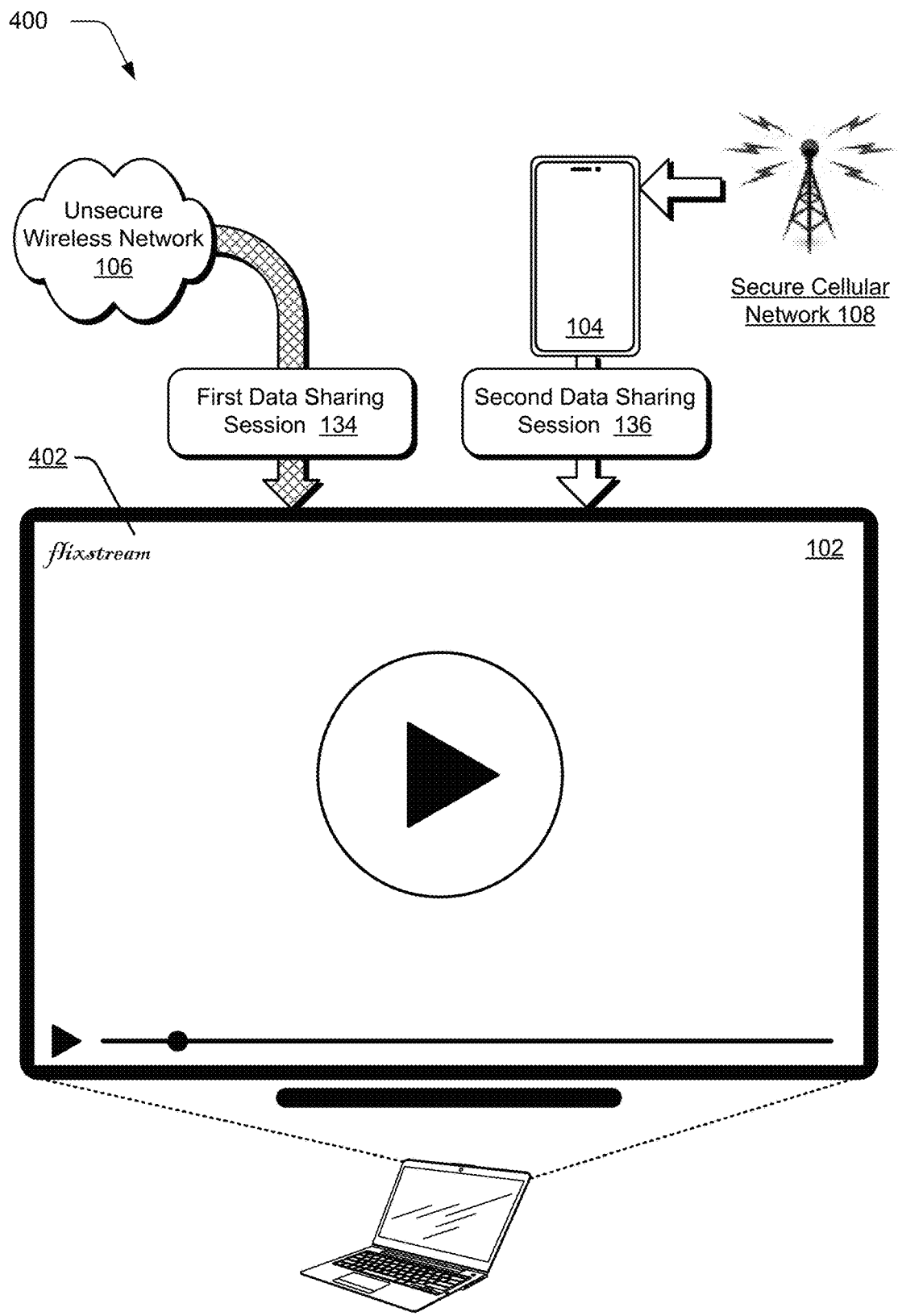
FIG. 4 depicts an example for connecting a first data sharing session based on an unrestricted application executing on a computing device in accordance with one or more implementations.

FIG. 4 depicts an example 400 for connecting a first data sharing session based on an unrestricted application executing on a computing device in accordance with one or more implementations. The example 400 depicts a media streaming application 402 executing on the computing device 102. The media streaming application 402 is a type of application that is not likely to include sensitive personal information in network communications. Accordingly, the media streaming application 402 can be designated as an unrestricted application 128 in accordance with the techniques described herein. As shown in the example 400, the first data sharing session 134 is connected (as illustrated by the hatching included in the arrow associated with the first data sharing session 134) to enable network communications with the unsecure wireless network 106 while the media streaming application 402 is executing on the computing device 102.

Moreover, the second data sharing session 136 is disconnected (as illustrated by the hatching not being included in the arrow associated with the second data sharing session 136) to disable network communications over the secure cellular network 108 while the media streaming application is executing on the computing device 102. In this way, the user 110 is able to take advantage of the free network data consumption offered by the unsecure wireless network while executing an application that exposes the user 110 to a reduced risk of theft of personal information.

Figure 5:
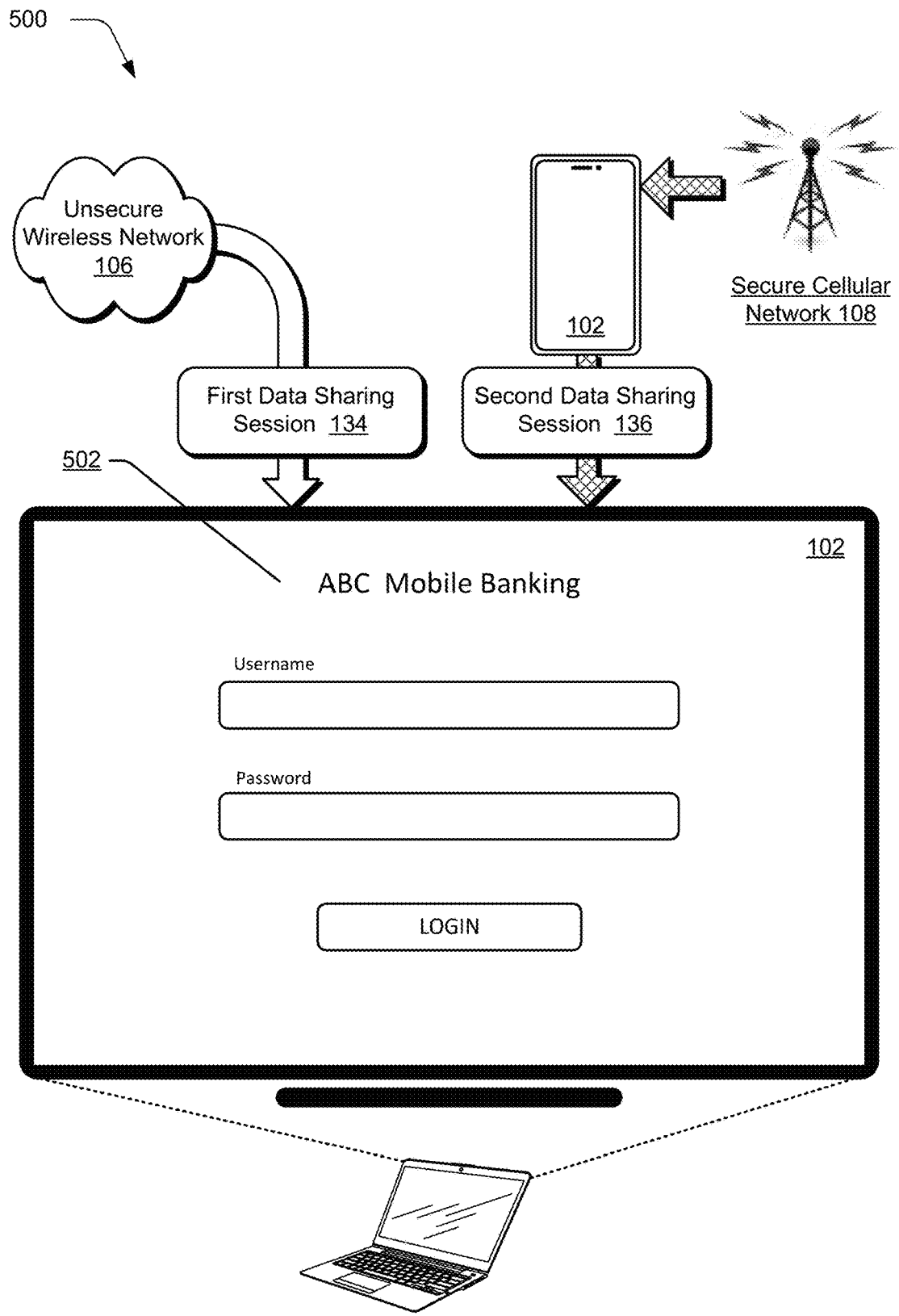
FIG. 5 depicts an example for connecting a second data sharing session based on a restricted application executing on a computing device in accordance with one or more implementations.

FIG. 5 depicts an example 500 for connecting a second data sharing session based on a restricted application executing on a computing device in accordance with one or more implementations. The example 500 depicts an online banking application 502 executing on the computing device 102. The online banking application 502 is a type of application that is likely to include sensitive personal information in network communications. Accordingly, the online banking application 502 can be designated as a restricted application 126 in accordance with techniques described herein.

As shown in the example 500, the second data sharing session 136 is connected (as illustrated by the hatching included in the arrow associated with the second data sharing session 136) in response to execution of the online banking application 502 being detected. This causes the mobile device 104 to provide cellular data to the computing device 102, thus enabling network communications over the secure cellular network 108 for the computing device 102. Further, the first data sharing session 134 is disconnected (as illustrated by the hatching not being included in the arrow associated with the first data sharing session 134) in response to execution of the online banking application 502 being detected. By doing so, network communications over the unsecure wireless network 106 are disabled. In this way, the user 110 is able to take advantage of the increased network security offered by the secure cellular network 108 while executing an application that is likely to include sensitive personal information in network communications.

Figure 6:
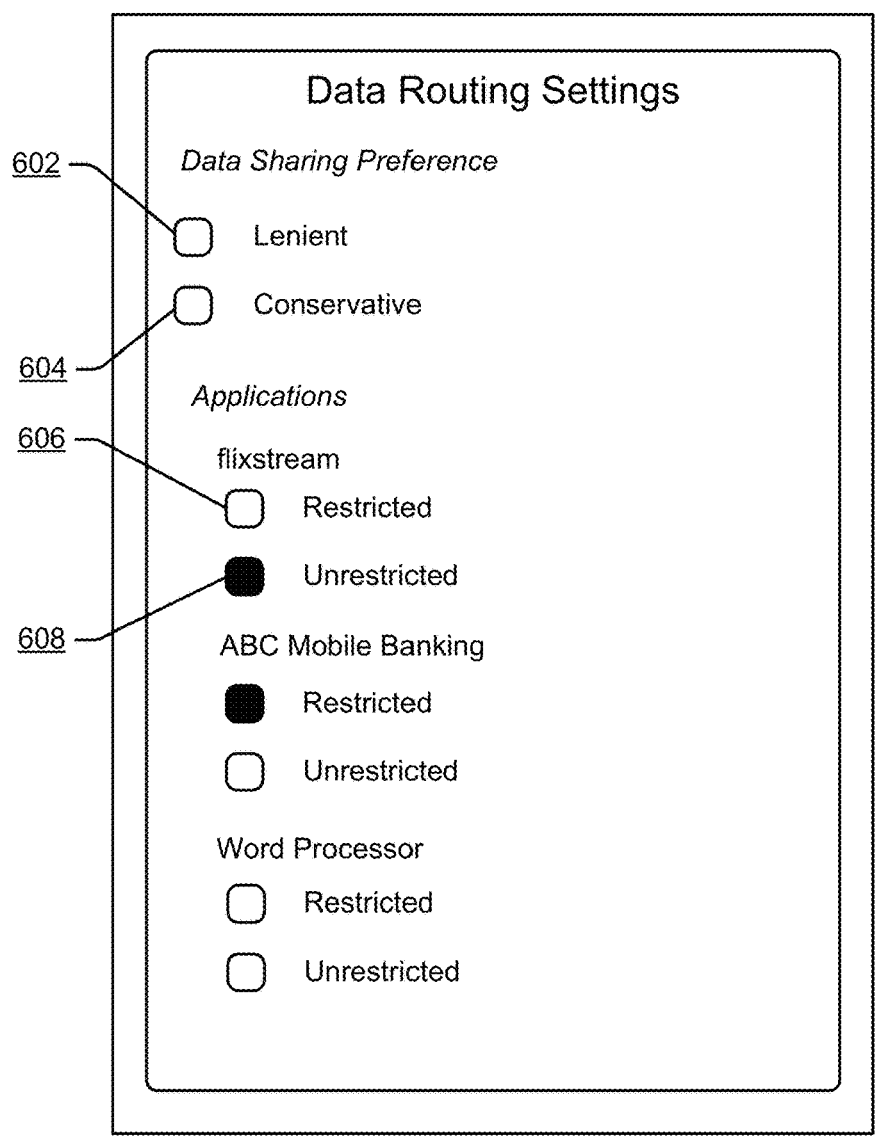
FIG. 6 depicts an example user interface for configuring data routing settings in accordance with one or more implementations.

FIG. 6 depicts an example user interface 600 for configuring data routing settings in accordance with one or more implementations. Notably, the example user interface may be presented on the display device 114 of the computing device 102 and/or on a display device of the mobile device 104. The example user interface 600 includes user interface element 602 that is selectable to specify the lenient data sharing preference 212, as well as user interface element 604 that is selectable to specify the conservative data sharing preference 214.

By implementing a user selection between the lenient data sharing preference 212 and the conservative data sharing preference 214, the data routing module 124a accounts for different user values regarding network communications. For example, a user that values conserving cellular data over security of personal information can select the lenient data sharing preference 212, while a user that values security of personal information over conserving cellular data can select the conservative data sharing preference 214.

Further, the example user interface 600 includes a list of the applications 118 of the computing device, including the media streaming application 402 (e.g., flixstream), the online banking application 502 (e.g., ABC Mobile Banking), and a productivity application (e.g., Word Processor). Each of the applications listed in the example user interface 600 is associated with a first user interface element 606 selectable to designate a respective application as a restricted application 126, and a second user interface element 608 selectable to designate a respective application as an unrestricted application 128.

Therefore, the user 110 can select the first user interface element 606 associated with the media streaming application 402 to designate the media streaming application 402 as a restricted application 126, rather than an unrestricted application 128. In addition, the user 110 can select the second user interface element 608 associated with the online banking application 502 to designate the online banking application as an unrestricted application 128, rather than a restricted application 126. Furthermore, the user can select either the first user interface element 606 or the second user interface element 608 associated with the productivity application, which is undesignated.

Figure 7:
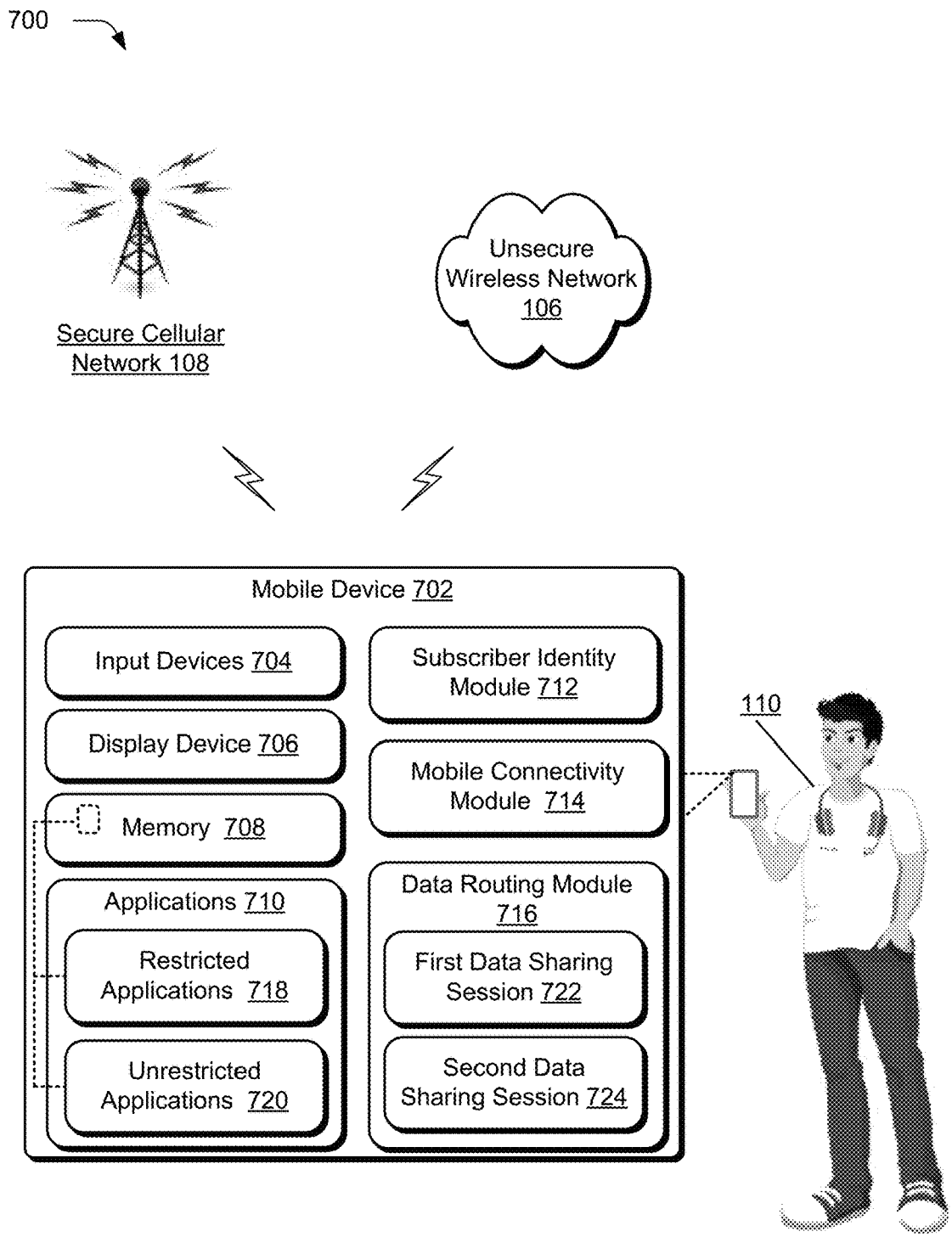
FIG. 7 depicts an example environment in which aspects of data routing based on application restriction designation can be implemented.

FIG. 7 depicts an example environment 700 in which aspects of data routing based on application restriction designation can be implemented. The example environment 700 includes a mobile device 702 that is directly connectable to the unsecure wireless network 106 as well as the secure cellular network 108. By way of example, the mobile device 702 represents a portable device that can be carried by the user 110, such as a tablet device or a smartphone. It should be noted, however, that the mobile device 702 can be implemented in a variety of different ways and form factors, without departing from the spirit or scope of the described techniques. Example attributes of the mobile device 702 are discussed below with reference to device 1400 of FIG. 14.

The mobile device 702 includes various functionality that enables the mobile device 702 to perform different aspects of data routing based on application restriction designation discussed herein, including input devices 704, a display device 706, memory 708, applications 710, a subscriber identity module 712, a mobile connectivity module 714, and a data routing module 716. The input devices 704 represent functionality for enabling input to the mobile device 702, such as user input to invoke functionality of the mobile device 702. The input devices 704 can be implemented in various ways, such as touch input, audible input (e.g., speech), a physical keyboard, and so forth.

As further discussed above with reference to FIG. 1, the unsecure wireless network 106 can be a public Wireless Local Area Network (WLAN) (e.g., a public Wi-Fi network). By way of example, the unsecure wireless network 106 can be an open W-Fi network that can be joined by anyone without entering a password, a Wi-Fi network that is joinable using a common password shared with all guests of a public establishment, or a Wi-Fi network that is joinable via a one-time password linked with a user's phone number and/or basic user data.

The applications 710 represent functionality for performing different computing tasks via the mobile device 702, such as gaming, media consumption (e.g., content streaming), productivity tasks (e.g., word processing, content generation, data analysis, etc.), financial tasks (e.g., sending or receiving payments, viewing bank statements), communication tasks (e.g., sending or receiving e-mails and/or messages), and so forth. The content of the applications 710 is viewable by the user 110 on the display device 706 of the mobile device 702. Some types of applications 710, such as financial applications (e.g., online banking applications, online payment applications) and communication applications (e.g., e-mail applications, messaging applications) often include sensitive personal information in network communications (e.g., with the unsecure wireless network 106 and/or the secure cellular network 108). These types of applications 710 may be designated as restricted applications 718 to utilize secure network data. Other types of applications, such as gaming applications and media consumption applications (e.g., content streaming) often do not include sensitive personal information in network communications (e.g., with the unsecure wireless network 106 and/or the secure cellular network 108). These types of applications 710 may be designated as unrestricted applications 720 to utilize unsecure network data.

In other words, the mobile device 702 is restricted from communicating with the unsecure wireless network 106 while executing the restricted applications 718. Further, the mobile device 702 is free to communicate with the unsecure wireless network 106 while executing the unrestricted applications 720. In implementations, a list of the restricted applications 718 and the unrestricted applications 720 are maintained as application designation data in memory 708 of the mobile device 702.

The subscriber identity module 712 represents functionality to enable network data communications to the mobile device 702 via the secure cellular network 108, which may be a 3G, 4G, and/or 5G cellular network. For instance, the mobile device 702 includes the subscriber identity module 712 (SIM, or commonly referred to as a SIM card) or an embedded SIM (eSIM) designed to securely store SIM information. The SIM information may include an international mobile subscriber identity (IMSI) number and related security key associated with the user 110 of the mobile device 702. For example, the subscriber identity module 712 is used to identify and authenticate the device as a subscriber on the secure cellular network 108, and enables a subscription with a wireless network operator for wireless communication by the mobile device 702 using the secure cellular network 108 associated with the wireless network operator.

The mobile connectivity module 714 represents functionality (e.g., logic and hardware) for enabling the mobile device 702 to interconnect with other devices and/or networks, such as the unsecure wireless network 106 and the secure cellular network 108. The mobile connectivity module 714, for instance, enables wireless and/or wired connectivity of the mobile device 702.

In contrast to the environment 100 of FIG. 1, there is no intermediate device to provide cellular data to the mobile device 702 via a network connection established between the intermediate device and the secure cellular network 108. Rather, the mobile device 702 includes SIM functionality to connect directly to the secure cellular network 108. Moreover, the mobile device 702 includes functionality to connect directly to the unsecure wireless network 106 (e.g., via the mobile connectivity module 714). Therefore, the mobile device 702 is capable of communicating directly with the secure cellular network 108 and the unsecure wireless network 106.

Therefore, the data routing module 716 operates in a similar manner to the data routing module 124a, 124b as discussed above with reference to FIGS. 1-6. However, the data routing module 716 represents functionality to connect the mobile device 702 directly to the unsecure wireless network 106 or the secure cellular network 108 depending on whether a restricted application 718 or an unrestricted application 720 is executing on the mobile device 702. In contrast, the data routing module 124a, 124b as described with reference to FIGS. 1-6, represents functionality to connect a computing device directly to the unsecure wireless network 106, or to an additional intermediate device such that the intermediate device can provide cellular data to the computing device over the secure cellular network 108.

For example, the data routing module 716 can detect an unrestricted application 720 executing on the mobile device 702, and in response, connect a first data sharing session 722 for the mobile device 702 to receive unsecure network data directly from the unsecure wireless network 106. Additionally or alternatively, the data routing module 716 can detect a restricted application 718 executing on the mobile device 702, and in response, connect a second data sharing session 724 for the mobile device 702 to receive secure network data directly from the secure cellular network 108.

Therefore, the data routing module 716 enables similar benefits as the data routing module 124a, 124b of FIGS. 1-6. For example, the data routing module 716 enables the user to take advantage of the free network data consumption offered by the unsecure wireless network 106 while executing unrestricted applications 720 that are not likely to include sensitive personal information in network communications with the unsecure wireless network 106. Moreover, the data routing module 716 enables the user to take advantage of the network security offered by the secure cellular network 108 while executing restricted applications 718 that are more likely to include sensitive personal information in network communications. However, the data routing module 716 enables the above-noted advantages in scenarios in which the user 110 is at a public location with publicly accessible Wi-Fi, but the user 110 only has a single device on their person (e.g., the mobile device 702).

Having discussed an example environment in which the disclosed techniques can be performed, consider now some example scenarios and implementation details for implementing the disclosed techniques.

Figure 8:
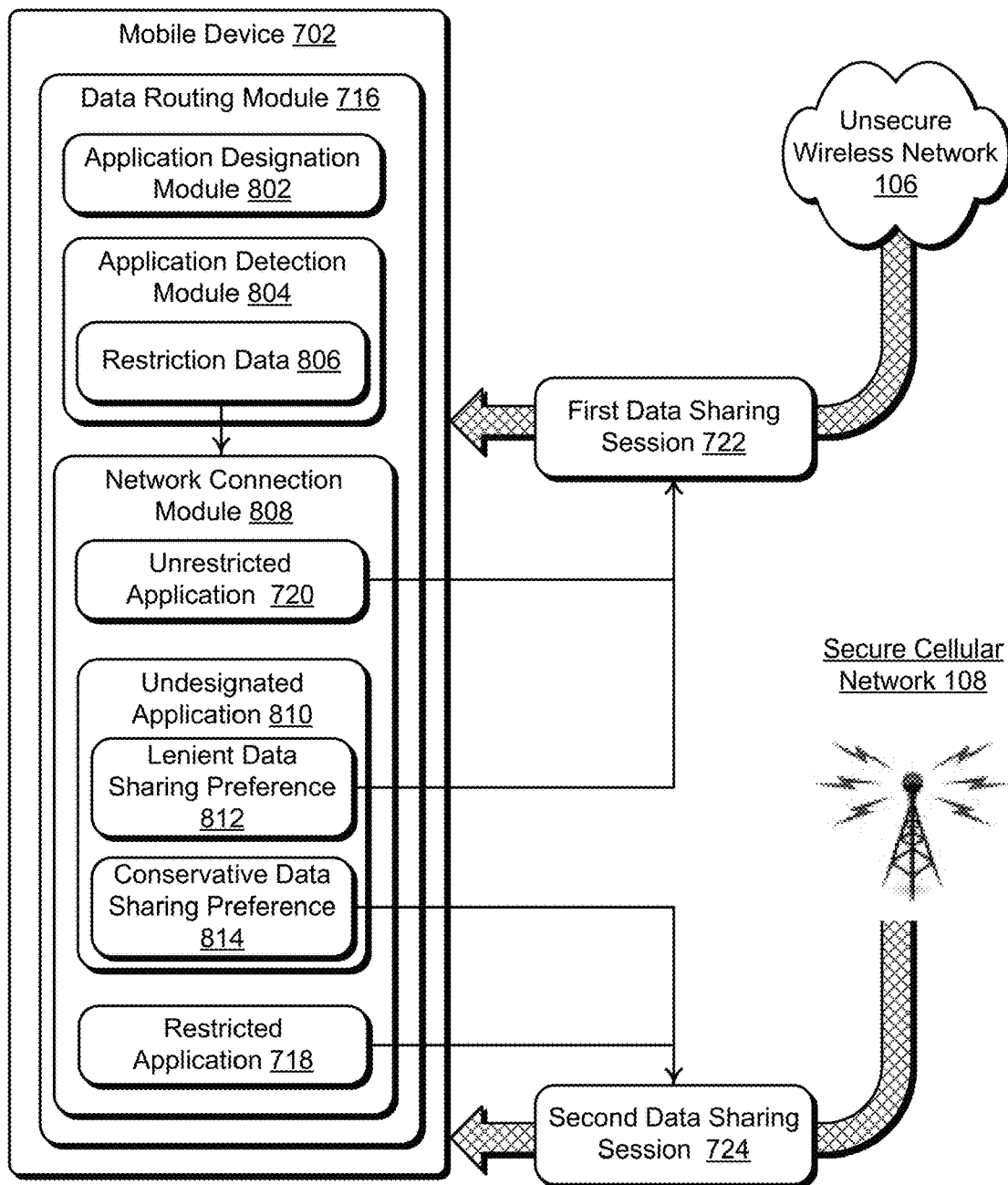
FIG. 8 depicts an example system in which aspects of data routing based on application restriction designation can be implemented by a standalone mobile device.

FIG. 8 depicts an example system 800 in which aspects of data routing based on application restriction designation can be implemented by a standalone mobile device. Generally, the system 800 can be implemented in the environment 700 and incorporates the attributes of the environment 700 introduced above.

In the system 800, a first data sharing session 722 is established for the mobile device 702 to receive unsecure network data over the unsecure wireless network 106. The first data sharing session 722 is established via a direct connection between the mobile device 702 and the unsecure wireless network 106. For example, the mobile device 702 leverages the mobile connectivity module 714 to connect to a public Wi-Fi network. In some implementations, the data routing module 716 automatically determines that a connected network is unsecure and/or untrusted. For example, in response to connecting to a wireless network, the data routing module 716, automatically and without user input, determines that the wireless network is a public Wi-Fi network and designates the wireless network as unsecure. Additionally or alternatively, in response to connecting to a wireless network that the mobile device 702 has not previously connected to, the data routing module 716 may display a user interface element prompting the user to designate the wireless network as secure or unsecure. Notably, a data sharing session may be maintained over a secure network connection (e.g., a home/work Wi-Fi network) regardless of whether a restricted application 718 or an unrestricted application 720 is executing on the mobile device 702.

Further, a second data sharing session 724 is established for the mobile device 702 to receive secure network data over the secure cellular network 108. The second data sharing session 724 is established via a direct connection between the mobile device 702 and the secure cellular network 108. For example, mobile device 702 leverages the mobile connectivity module 714 to connect to the secure cellular network 108. Notably, the subscriber identity module 712 of the mobile device 702 enables the mobile device 702 to communicate directly with the secure cellular network 108. Therefore, two data sharing sessions are accessible by the mobile device 702—a first data sharing session 722 via a direct connection to the unsecure wireless network 106 and a second data sharing session 724 via a direct connection to the secure cellular network 108.

The data routing module 716 includes an application designation module 802, which represents functionality to designate the applications 710 individually as either a restricted application 718 or an unrestricted application 720. In one or more implementations, the application designation module 802 automatically designates an application 710 as restricted or unrestricted in response to the application being downloaded on the mobile device 702. Notably, this automatic designation of the application 710 occurs without further input to designate the application 710 (e.g., without further input apart from input to download the application 710).

In accordance with the described techniques, the application designation module 802 can automatically designate an application 710 of the mobile device 702 as a restricted application 718 or an unrestricted application 720 based on application metadata for categorizing the application 710 into one of a plurality of application categories. For example, the application 710 may be downloaded from a download source, such as an online application store. Oftentimes, the application 710 downloaded from such a download source includes application metadata for categorizing the application 710 into one of a plurality of categories (e.g., a gaming category, an entertainment category, a financial category, etc.). The application designation module 802 can leverage this application metadata to identify an application category of the application 710 and designate the application 710 based on the application category.

By way of example, the application designation module 802 can be configured to designate financial applications as restricted applications 718 and entertainment applications as unrestricted applications 720. Therefore, if the application metadata categorizes the application 710 as "finance," "financial," "payment," or any other suitable category, then the application designation module 802 designates the application 710 as a restricted application 718. Further, if the application metadata categorizes the application 710 as "entertainment, "streaming," or any other suitable category, then the application designation module 802 designates the application 710 as an unrestricted application 720.

In some implementations, the application designation module 802 can automatically designate an application 710 of the mobile device 702 as a restricted application 718 or an unrestricted application 720 based on key terms relating to an application category identified in listing information obtained from a download source associated with the application 710. For example, application listings (e.g., as listed on a download source, such as an application store) often include an application description. In response to an application being downloaded, the application designation module 802 can search the application description included in the listing for key terms associated with a plurality of application categories in order to designate the application 710. By way of example, the application designation module 802 can determine that the application 710 is a financial application based on the application description including key terms relating to finances, such as "finance," "banking," and "transaction," and designate the application 710 as a restricted application 718. In another example, the application designation module 802 can determine that the application 710 is an entertainment application based on the application description including key terms relating to entertainment, such as "entertainment," "stream," and "streaming," and designate the application 710 as an unrestricted application 720.

Additionally or alternatively, the application designation module 802 designates an application 710 based on user input to specify the application 710 as a restricted application 718 or an unrestricted application 720. For example, the application designation module 802 can display a user interface, such as user interface 600, that displays a list of downloaded applications 710 and enables the user 110 to provide user input designating the applications 710 as restricted applications 718 or unrestricted applications 720. The user input can override an application designation made automatically by the application designation module 802 (e.g., based on application metadata and/or download source listing information), or designate an application 710 not previously designated by the application designation module 802 (e.g., due to insufficient application metadata and download source listing information to designate the application 710). A list of the restricted applications 718 and the unrestricted applications 720 can be maintained in memory 708 of the mobile device 702.

The data routing module 716 further includes an application detection module 804 configured to detect execution of restricted applications 718, unrestricted applications 720, and/or applications that are not yet designated as restricted or unrestricted (e.g., undesignated applications). To do so, the application detection module 804 receives an indication of the applications 710 that are currently executing on the mobile device 702 for comparison to the list of restricted applications 718 and unrestricted applications 720 maintained in memory 708. Based on the comparison, the application detection module 804 can generate restriction data 806 that indicates one of the following: only restricted applications 718 are executing on the mobile device 702, only unrestricted applications 720 are executing on the mobile device 702, both restricted applications 718 and unrestricted applications 720 are executing on the mobile device 702, or at least one undesignated application is executing on the mobile device 702.

The restriction data 806 is then passed as an input to a network connection module 808, which represents functionality to connect either the first data sharing session 722 or the second data sharing session 724 based on the restriction data 806. For example, if the restriction data 806 indicates that only unrestricted applications 720 are executing on the mobile device 702, then the network connection module 808 connects the first data sharing session 722 for the mobile device 702 to receive unsecure network data over the unsecure wireless network 106. For instance, the network connection module 808 leverages the mobile connectivity module 714 to connect the mobile device 702 to the unsecure wireless network 106, thereby enabling the mobile device 702 to communicate directly with the unsecure wireless network 106. The network connection module 808 also disconnects the second data sharing session 724 based on the restriction data 806 indicating that only unrestricted applications 720 are executing on the mobile device 702. For instance, the network connection module 808 leverages the mobile connectivity module 714 to disconnect the mobile device 702 to no longer receive the secure network data over the secure cellular network 108. In this way, the mobile device 702 communicates directly with the unsecure wireless network 106 to facilitate execution of the unrestricted applications 720.

If the restriction data 806 indicates that only restricted applications 718 are executing on the mobile device 702, then the network connection module 808 connects the second data sharing session 724 for the mobile device 702 to receive secure network data over the secure cellular network 108. To do so, the network connection module 808 leverages the mobile connectivity module 714 to connect the mobile device 702 to the secure cellular network 108, thereby enabling the mobile device 702 to communicate directly with the secure cellular network 108. The network connection module 808 also disconnects the first data sharing session 722 based on the restriction data 806 indicating that only restricted applications 718 are executing on the mobile device 702. To do so, the network connection module 808 leverages the mobile connectivity module 714 to disconnect the mobile device 702 to no longer receive the unsecure network data over the unsecure wireless network 106. In this way, the mobile device 702 communicates directly with the secure cellular network 108 to facilitate execution of the restricted applications 718.

If the restriction data 806 indicates that both restricted applications 718 and unrestricted applications are executing on the mobile device 702, then the network connection module 808 defaults to connecting the second data sharing session 724 for the mobile device 702 to receive secure network data over the secure cellular network 108. The network connection module 808 also disconnects the first data sharing session 722. In this way, the mobile device 702 communicates directly with the secure cellular network 108 if at least one restricted application 718 is executing on the mobile device 702.

Notably, the network connection module 808 facilitates connection of either the first data sharing session 722 or the second data sharing session 724 without user input to select the first data sharing session 722 or the second data sharing session 724. In other words, apart from user input to open and interact with an unrestricted application 720, the user 110 need not provide additional input to connect the first data sharing session 722 and disconnect the second data sharing session 724. Further, apart from user input to subsequently open and interact with a restricted application 718, the user 110 need not provide further input to connect the second data sharing session 724 and disconnect the first data sharing session 722. Accordingly, the user 110 does not need to manually connect the second data sharing session 724 and disconnect the first data sharing session 722 (e.g., via network management settings) each time a restricted application 718 is opened, and vice versa.

In one or more implementations, the restriction data 806 indicates that an undesignated application 810 is executing on the mobile device 702. The undesignated application 810, for example, has not yet been designated as restricted or unrestricted (e.g., due to insufficient application metadata and download source listing information, and user input not yet being received to designate the undesignated application 810). Accordingly, the network connection module 808 may receive data sharing preference data indicating one of a lenient data sharing preference 812 or a conservative data sharing preference 814. For example, the user 110 may provide input via a user interface, such as user interface 600, to specify either the lenient data sharing preference 812 or the conservative data sharing preference 814. The lenient data sharing preference 812 indicates a user preference to communicate with the unsecure wireless network 106 while the undesignated application 810 is executing on the mobile device 702. The conservative data sharing preference 814 indicates a user preference to communicate with the secure cellular network 108 while the undesignated application 810 is executing on the mobile device 702.

If the data sharing preference data indicates a lenient data sharing preference 812, the network connection module 808 treats the undesignated application 810 as an unrestricted application 720. For instance, if the restriction data 806 indicates that the undesignated application 810 is executing on the mobile device 702, the network connection module 808 connects the first data sharing session 722 for the mobile device 702 to receive the unsecure network data over the unsecure wireless network 106. In addition, the network connection module 808 disconnects the second data sharing session 724. In this way, the mobile device 702 communicates directly with the unsecure wireless network 106 to facilitate execution of the undesignated application 810 if the lenient data sharing preference 812 is specified.

In contrast, if the data sharing preference data indicates a conservative data sharing preference 814, the network connection module 808 treats the undesignated application 810 as a restricted application 718. For instance, if the restriction data 806 indicates that the undesignated application 810 is executing on the mobile device 702, the network connection module 808 connects the second data sharing session 724 for the mobile device 702 to receive the secure network data over the secure cellular network 108. In addition, the network connection module 808 disconnects the first data sharing session 722. In this way, the mobile device 702 communicates directly with the secure cellular network 108 to facilitate execution of the undesignated application 810 if the conservative data sharing preference 814 is specified.

Figure 9:
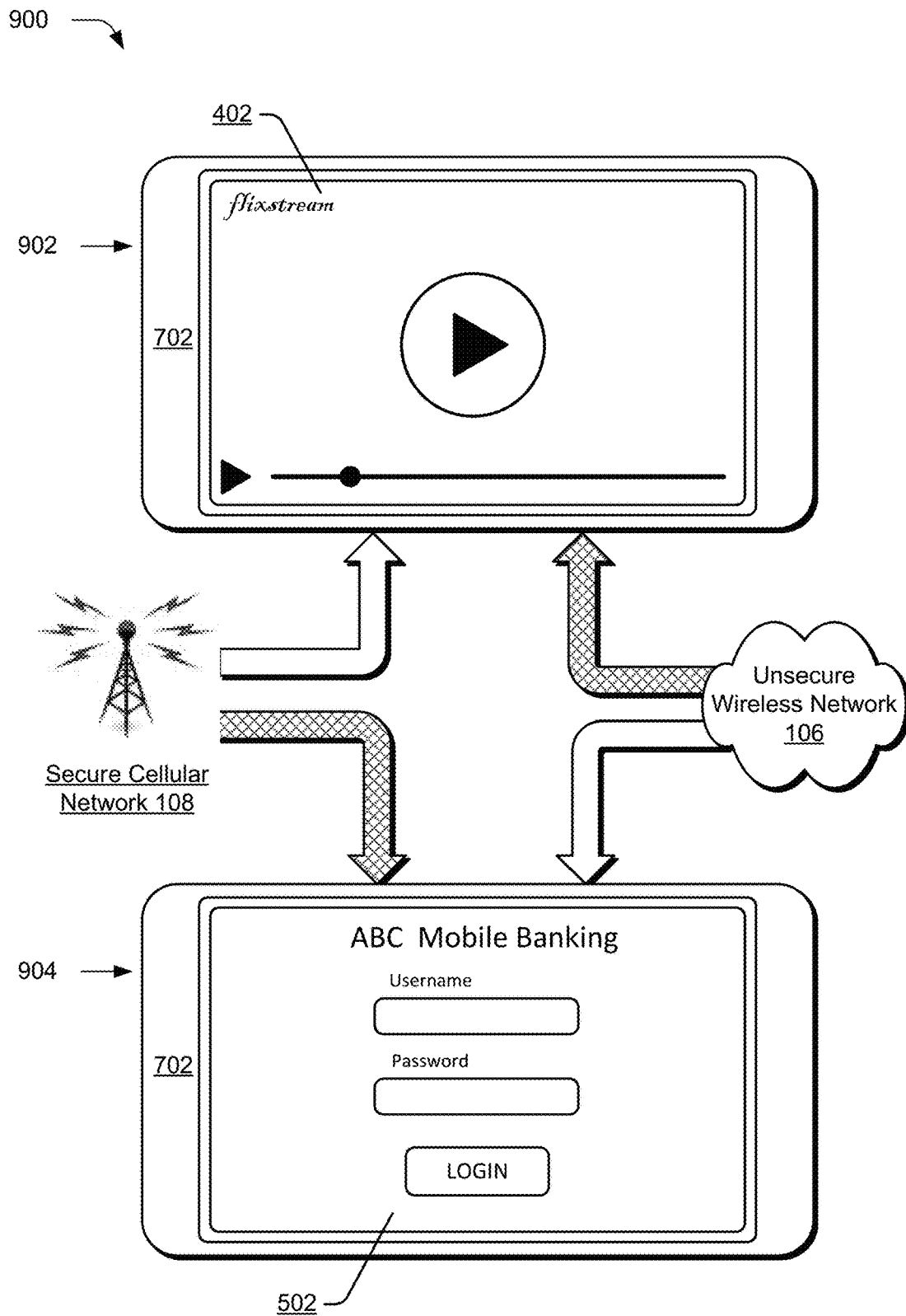
FIG. 9 depicts an example for connecting a mobile device to either a secure cellular network or an unsecure wireless network based on whether a restricted application or an unrestricted application is executing on the mobile device.

FIG. 9 depicts an example 900 for connecting a mobile device to either a secure cellular network or an unsecure wireless network based on whether a restricted application or an unrestricted application is executing on the mobile device. At 902, the media streaming application 402, designated as an unrestricted application 720 in accordance with techniques described herein, is illustrated as executing on the mobile device 702. As shown, the mobile device 702 is connected directly to the unsecure wireless network 106 (as illustrated by the hatching in the arrow connecting the unsecure wireless network 106 and the mobile device 702) to enable network communications with the unsecure wireless network 106 while the media streaming application 402 is executing on the mobile device 702. Moreover, the mobile device 702 is disconnected from the secure cellular network 108 (as illustrated by the hatching not being included in the arrow connecting the secure cellular network 108 and the mobile device 702) to disable network communications over the secure cellular network 108 while the media streaming application 402 is executing on the mobile device 702.

At 904, the online banking application 502, designated as a restricted application 718 in accordance with techniques described herein, is illustrated as executing on the mobile device 702. As shown, the mobile device 702 is connected directly to the secure cellular network 108 (as illustrated by the hatching in the arrow connecting the secure cellular network 108 and the mobile device 702) to enable network communications with the secure cellular network 108 while the online banking application 502 is executing on the mobile device 702. Moreover, the mobile device 702 is disconnected from the unsecure wireless network 106 (as illustrated by the hatching not being included in the arrow connecting the unsecure wireless network 106 and the mobile device 702) to disable network communications over the unsecure wireless network 106 while the online banking application 502 is executing on the mobile device 702.

Example methods 1000, 1100, 1200, and 1300 are described with reference to respective FIGS. 10, 11, 12, and 13 in accordance with implementations for data routing based on application restriction designation. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 10:
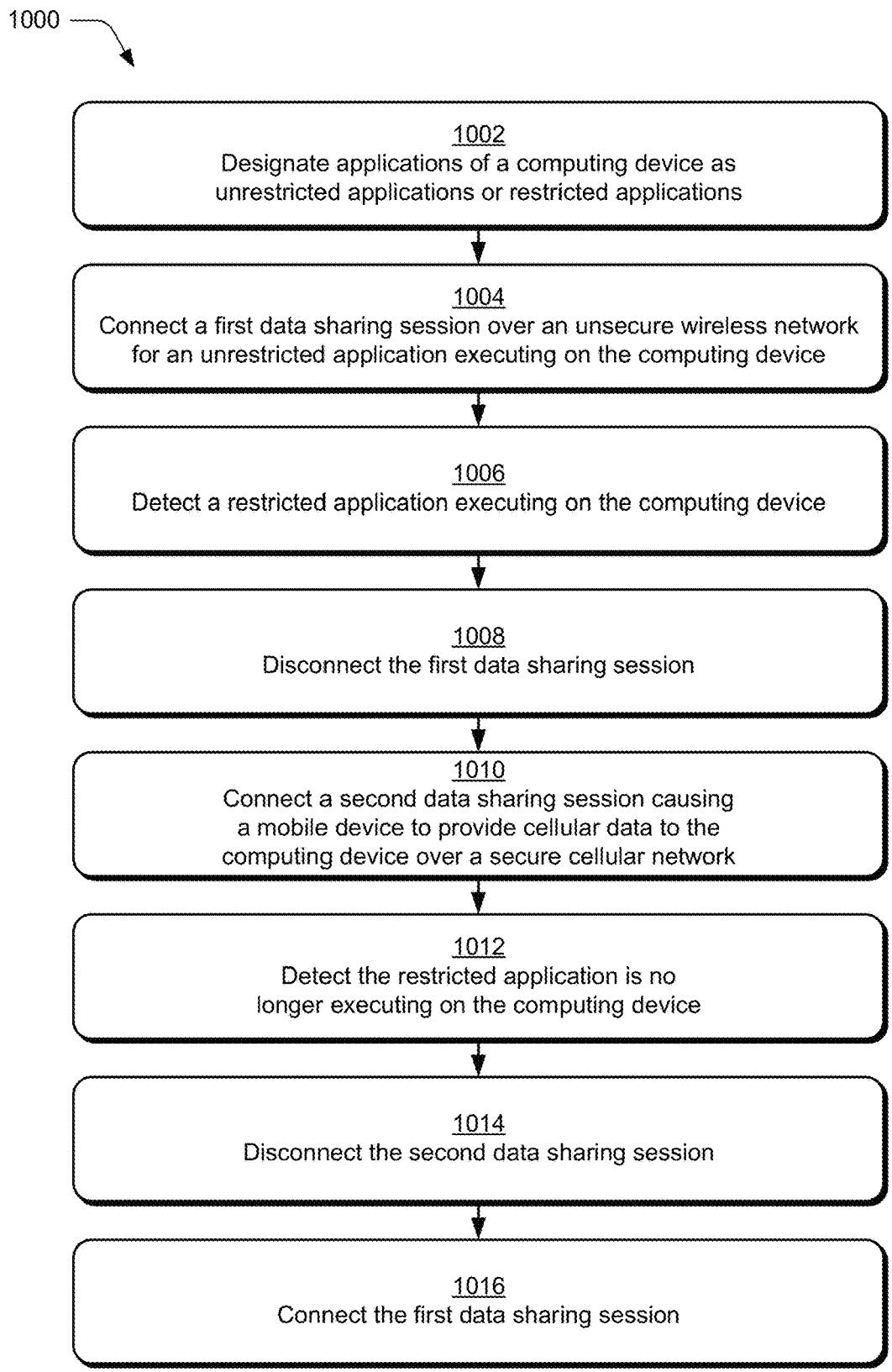
FIG. 10 depicts an example method of data routing based on application restriction designation as implemented by a computing device communicatively coupled to a mobile device in accordance with one or more implementations.

FIG. 10 depicts an example method 1000 of data routing based on application restriction designation as implemented by a computing device communicatively coupled to a mobile device in accordance with one or more implementations. The order in which the method is described is not intended to be construed as a limitation, and any number or combination of the described method operations can be performed in any order to perform a method, or an alternate method.

At 1002, applications of a computing device are designated as unrestricted applications or restricted applications. For example, the application designation module 202a designates the applications 118 as either restricted applications 126 or unrestricted applications 128. In some implementations, the applications 118 are automatically designated by the application designation module 202a based on at least one of application metadata of the applications or listing information obtained from download sources associated with the applications. Additionally or alternatively, the application designation module 202a receives user input (e.g., via the user interface elements 606, 608) designating the restricted applications 126 and the unrestricted applications 128. The restricted applications 126 are designated to utilize secure network data to facilitate execution of the restricted applications 126, while the unrestricted applications 128 are designated to utilize unsecure network data to facilitate execution of the unrestricted applications 128.

At 1004, a first data sharing session over an unsecure wireless network is connected for an unrestricted application executing on the computing device. For example, the application detection module 204a detects an unrestricted application 128 executing on the computing device 102. Further, the network connection module 208a connects the first data sharing session 134, thus enabling network communications over the unsecure wireless network 106 for the computing device 102.

At 1006, a restricted application is detected as executing on the computing device. For example, the application detection module 204a detects a restricted application 126 executing on the computing device 102.

At 1008, the first data sharing session is disconnected. For example, the network connection module 208a disconnects the first data sharing session 134, thus disabling network communications over the unsecure wireless network 106.

At 1010, a second data sharing is connected causing a mobile device to provide cellular data to the computing device over a secure cellular network. For example, the network connection module 208a connects the second data sharing session 136, causing the mobile device 104 to provide cellular data to the computing device 102 over the secure cellular network 108. As a result, network communications over the secure cellular network 108 are enabled for the computing device 102.

At 1012, a restricted application is detected as no longer executing on the computing device. For example, the application detection module 204a detects that the restricted application 126 is no longer executing on the computing device 102.

At 1014, the second data sharing session is disconnected. For example, the network connection module 208a disconnects the second data sharing session 136, causing the mobile device 104 to no longer provide cellular data to the computing device 102 over the secure cellular network 108. As a result, network communications over the secure cellular network 108 are disabled for the computing device 102.

At 1016, the first data sharing session is connected. For example, the network connection module 208a connects the first data sharing session 134, thus enabling network communications over the unsecure wireless network 106 for the computing device 102.

Figure 11:
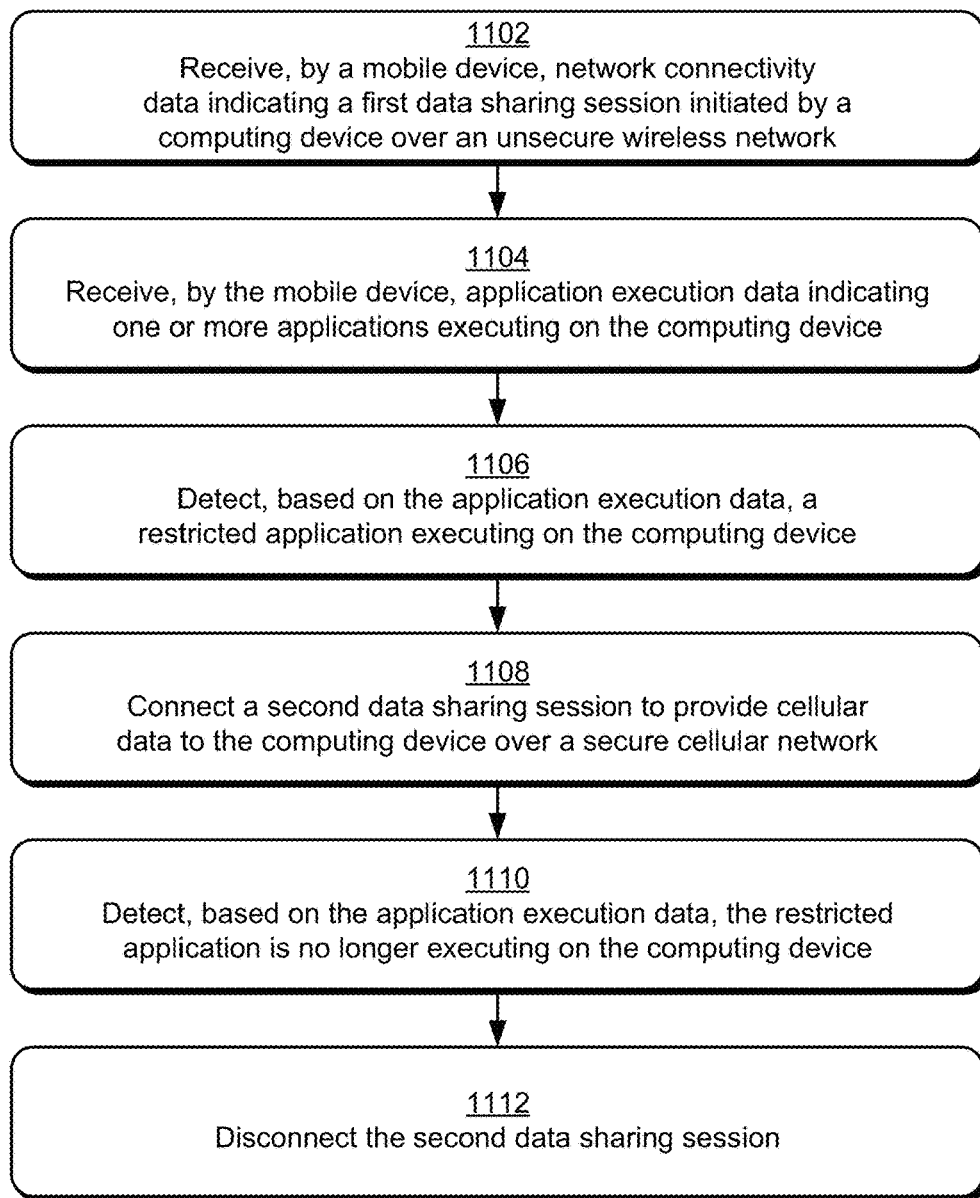
FIG. 11 depicts an example method of data routing based on application restriction designation as implemented by a mobile device communicatively coupled to a computing device in accordance with one or more implementations.

FIG. 11 depicts an example method 1100 of data routing based on application restriction designation as implemented by a mobile device communicatively coupled to a computing device in accordance with one or more implementations. The order in which the method is described is not intended to be construed as a limitation, and any number or combination of the described method operations can be performed in any order to perform a method, or an alternate method.

At 1102, network connectivity data is received by a mobile device indicating a first data sharing session initiated by a computing device over an unsecure wireless network. For example, the data routing module 124b of the mobile device 104 receives network connectivity data 302 indicating that the first data sharing session 134 over the unsecure wireless network 106 was initiated by the computing device 102 (i.e., to enable network communications with the unsecure wireless network 106).

At 1104, application execution data is received by the mobile device indicating one or more applications executing on the computing device. For example, the application detection module 204b receives the application execution data 304 from the computing device 102, indicating the applications 118 currently executing on the computing device 102.

At 1106, a restricted application is detected as executing on the computing device based on the application execution data. For example, the application detection module 204b compares the applications 118 currently executing on the computing device 102, as indicated by the application execution data 304, to a list of restricted applications 126 and unrestricted applications 128 maintained in memory of the mobile device 104. Based on the comparison, the application detection module 204b detects that a restricted application 126 is executing on the computing device 102.

At 1108, a second data sharing session is connected to provide cellular data to the computing device over a secure cellular network. For example, the network connection module 208b issues a connection instruction 306 in response to receiving restriction data 206b indicating that the restricted application 126 is executing on the computing device 102. The connection instruction 306 causes the mobile device 104 to connect the second data sharing session 136, which causes the mobile device 104 to provide the cellular data to the computing device 102 over the secure cellular network 108. In one or more implementations, the connection instruction also causes the computing device 102 to disconnect the first data sharing session 134 over the unsecure wireless network 106.

At 1110, the restricted application is detected as no longer executing on the computing device based on the application execution data. For example, the application execution data 304 is subsequently updated to no longer include the restricted application 126. Accordingly, the application detection module 204b detects that the restricted application 126 is no longer executing on the computing device 102 (e.g., only unrestricted applications are executing on the computing device 102).

At 1112, the second data sharing session is disconnected. For example, the network connection module 208b issues a disconnection instruction 308 in response to receiving the restriction data 206b indicating that the restricted application 126 is no longer executing on the computing device 102. The connection instruction 306 causes the mobile device 104 to disconnect the second data sharing session 136, which causes the mobile device 104 to no longer provide the cellular data to the computing device 102 over the secure cellular network 108. In one or more implementations, the disconnection instruction also causes the computing device 102 to connect the first data sharing session 134 over the unsecure wireless network 106.

Figure 12:
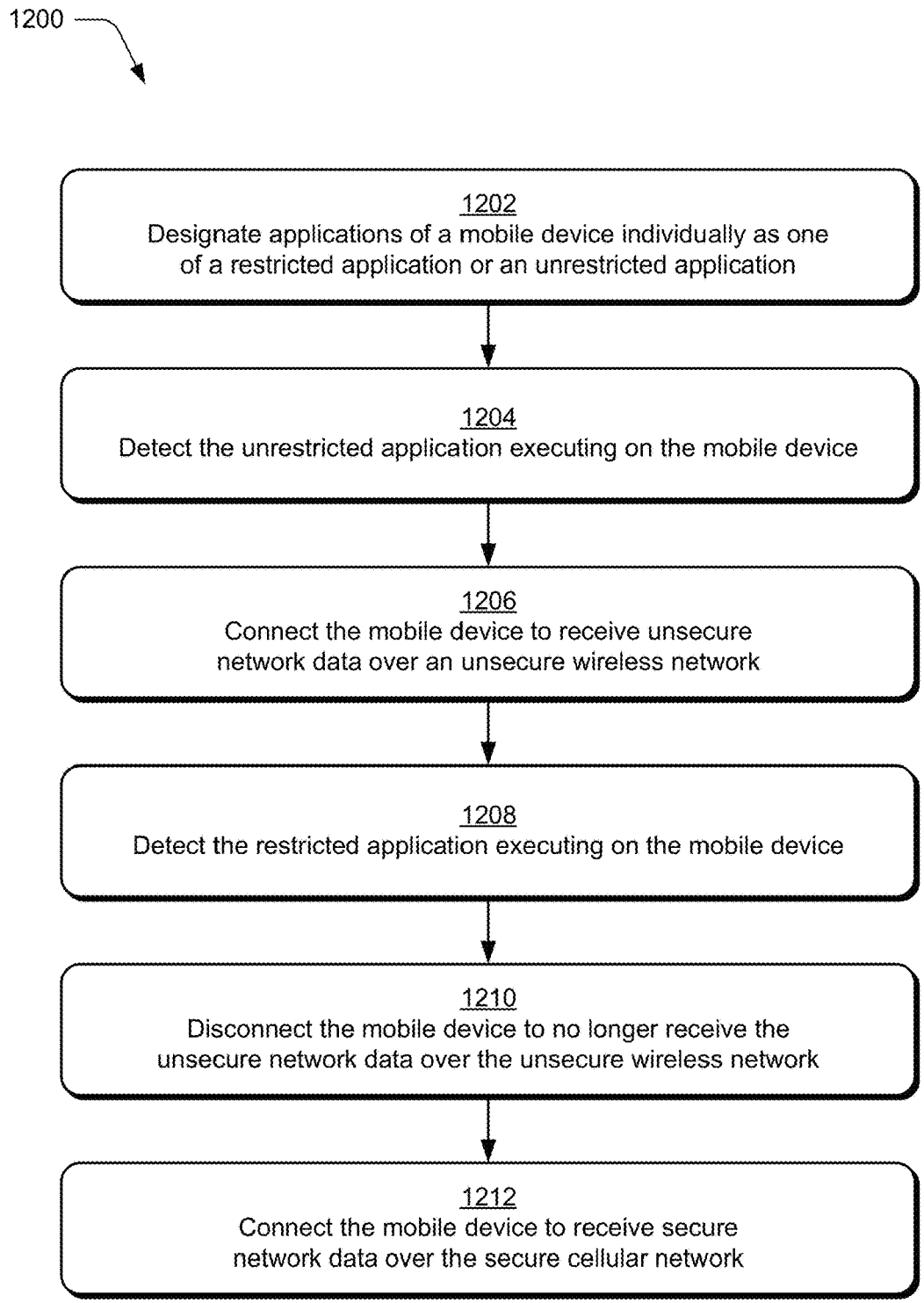
FIG. 12 depicts an example method of data routing based on application restriction designation as implemented by a standalone mobile device in accordance with one or more implementations.

FIG. 12 depicts an example method 1200 of data routing based on application restriction designation as implemented by a standalone mobile device in accordance with one or more implementations. The order in which the method is described is not intended to be construed as a limitation, and any number or combination of the described method operations can be performed in any order to perform a method, or an alternate method.

At 1202, applications of a mobile device are designated individually as one of a restricted application or an unrestricted application. For example, the application designation module 802 designates the applications 710 as either restricted applications 718 or unrestricted applications 720. In some implementations, the application designation module 802 designates an application 710 of the mobile device 702 as a restricted application 718 or an unrestricted application 720 based on at least one of application metadata of the application 710 or listing information obtained from a download source associated with the application 710. Additionally or alternatively, the application designation module 802 designates an application 710 of the mobile device 702 based on user input specifying the application 710 as a restricted application 718 or an unrestricted application 720. The restricted applications 718 are designated to utilize secure network data, while the unrestricted applications 720 are designated to utilize unsecure network data.

At 1204, the unrestricted application is detected as executing on the mobile device. For example, the application detection module 804 detects an unrestricted application 720 executing on the mobile device 702.

At 1206, the mobile device is connected to receive unsecure network data over an unsecure wireless network. For example, in response to detecting the unrestricted application 720 executing on the mobile device 702, the data routing module 716 connects the first data sharing session 722 for the mobile device 702 to receive unsecure network data over the unsecure wireless network 106. Therefore, mobile device 702 can communicate directly with the unsecure wireless network 106 to facilitate execution of the unrestricted application 720.

At 1208, the restricted application is detected as executing on the mobile device. For example, the application detection module 804 detects at least one restricted application 718 executing on the mobile device 702. In some implementations, the restricted application 718 is the only application detected as executing on the mobile device 702. Additionally or alternatively, the restricted application 718 is detected as executing concurrently with another restricted application 718 and/or an unrestricted application 720.

At 1210, the mobile device is disconnected to no longer receive the unsecure network data over the unsecure wireless network. For example, in response to detecting that at least one restricted application 718 is executing on mobile device 702, the data routing module 716 disconnects the first data sharing session 722 for the mobile device 702 to no longer receive unsecure network data over the unsecure wireless network 106. Therefore, network communications with the unsecure wireless network 106 are disabled if at least one restricted application 718 is executing on the mobile device 702.

At 1212, the mobile device is connected to receive secure network data over the secure cellular network. For example, in response to detecting that at least one restricted application 718 is executing on mobile device 702, the data routing module 716 connects the second data sharing session 724 for the mobile device 702 to receive secure network data over the secure cellular network 108. Therefore, the mobile device 702 can communicate directly with the secure cellular network 108 while at least one restricted application 718 is executing on the mobile device 702.

Figure 13:
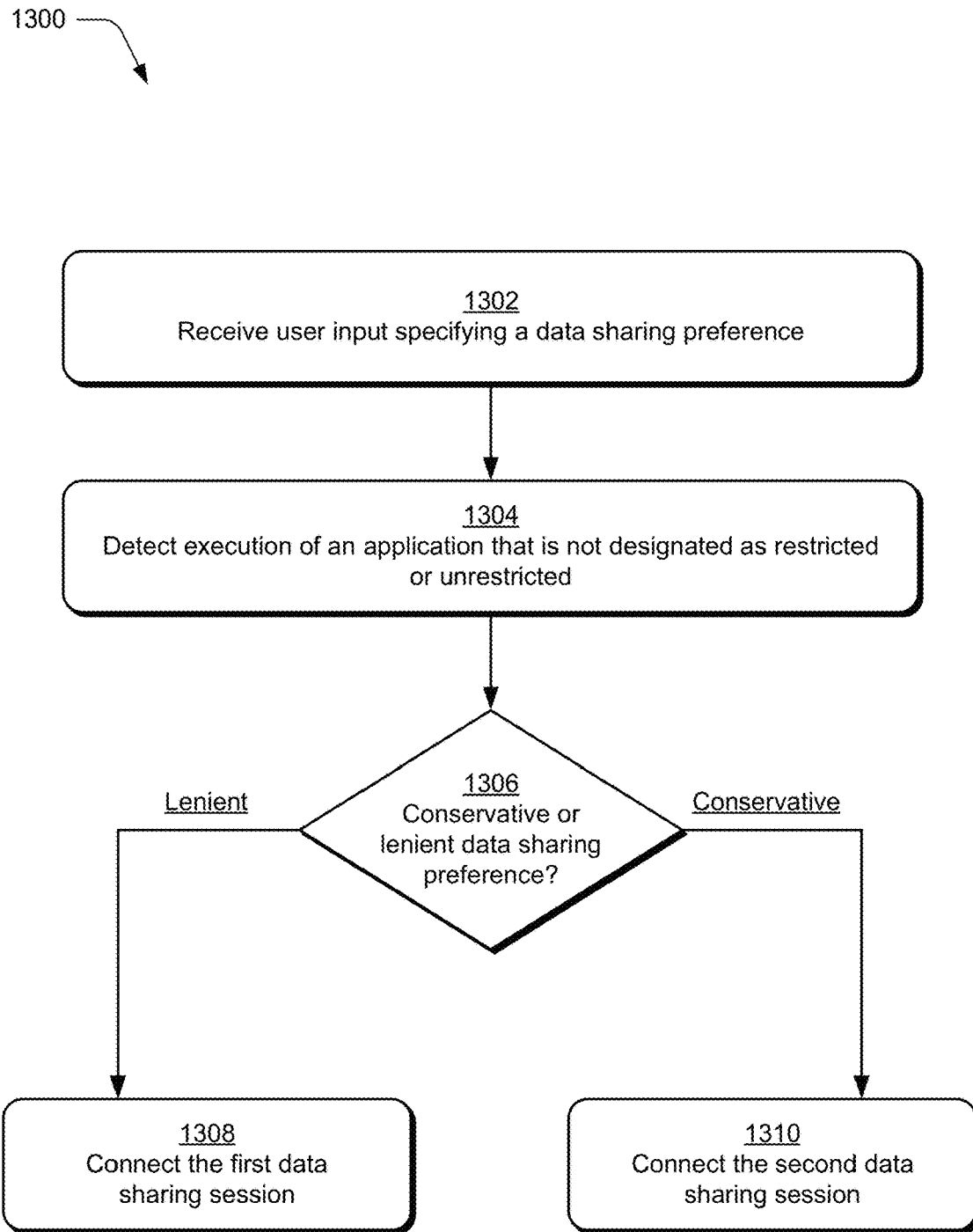
FIG. 13 depicts an example method of data routing based on a conservative or lenient data sharing preference in accordance with one or more implementations.

FIG. 13 depicts example method 1300 of data routing based on a conservative or lenient data sharing preference in accordance with one or more implementations. The order in which the method is described is not intended to be construed as a limitation, and any number or combination of the described method operations can be performed in any order to perform a method, or an alternate method.

At 1302, user input is received specifying a data sharing preference. For example, a user interface for configuring data routing settings is presented to the user 110, such as the example user interface 600. Further, the data routing module 124a, receives user input specifying either the lenient data sharing preference 212 (e.g., based on user input selecting the user interface element 602), or the conservative data sharing preference 214 (e.g., based on user input selecting the user interface element 604).

At 1304, execution of an application that is not designated as restricted or unrestricted is detected. For example, the application detection module 204a detects an undesignated application 210 executing on the computing device 102.

At 1306, a determination is made as to whether the lenient data sharing preference or the conservative data sharing preference is selected by the user. For example, the data routing module 124a accesses data sharing preference data maintained in memory 116 of the computing device 102 to determine whether the user 110 specified the lenient data sharing preference 212 or the conservative data sharing preference 214.

If the lenient data sharing preference 212 is indicated by the data sharing preference data (i.e. "Lenient"), then first data sharing session is connected at 1308. For example, the network connection module 208a connects the first data sharing session 134 over the unsecure wireless network 106 for the undesignated application 210 executing on the computing device 102 based on the lenient data sharing preference 212. The network connection module 208a also disconnects the second data sharing session 136. Therefore, network communications over the unsecure wireless network 106 are enabled while network communications over the secure cellular network 108 are disabled while the undesignated application 210 is executing on the computing device 102.

If the conservative data sharing preference 214 is indicated by the data sharing preference data (i.e., "Conservative"), then the second data sharing session is connected at 1310. For example, the network connection module 208a connects the second data sharing session 136 over the secure cellular network 108 for the undesignated application executing on the computing device 102 based on the conservative data sharing preference 214. The network connection module 208a also disconnects the first data sharing session 134. Therefore, network communications over the secure cellular network 108 are enabled while network communications over the unsecure wireless network 106 are disabled while the undesignated application 210 is executing on the computing device 102.

Although the method 1300 is discussed above as implemented by the computing device 102 communicatively coupled to the mobile device 104, it should be appreciated that the method 1300 is capable of being implemented by the mobile device 104 communicatively coupled to the computing device 102. For example, the application detection module 204b can detect an undesignated application 210 executing on the computing device 102. Based on the lenient data sharing preference 212, the network connection module 208b can issue the disconnection instruction 308 to initiate disconnecting the second data sharing session 136 and connecting the first data sharing session 134 at the computing device 102. Based on the conservative data sharing preference 214, the network connection module 208b can issue the connection instruction 306 to initiate connecting the second data sharing session 136 and disconnecting the first data sharing session 134 at the computing device 102.

Although the method 1300 is discussed above as implemented by the computing device 102 communicatively coupled to the mobile device 104, it should be appreciated that the method 1300 is capable of being implemented by the standalone mobile device 702. For example, the application detection module 804 can detect an undesignated application 810 executing on the mobile device 702. Based on the lenient data sharing preference 812, the network connection module 808 can connect the mobile device 702 directly to the unsecure wireless network 106 and disconnect the mobile device 702 from the secure cellular network 108. Based on the conservative data sharing preference 814, the network connection module 808 can connect the mobile device 702 directly to the secure cellular network 108 and disconnect the mobile device 702 from the unsecure wireless network 106.

Figure 14:
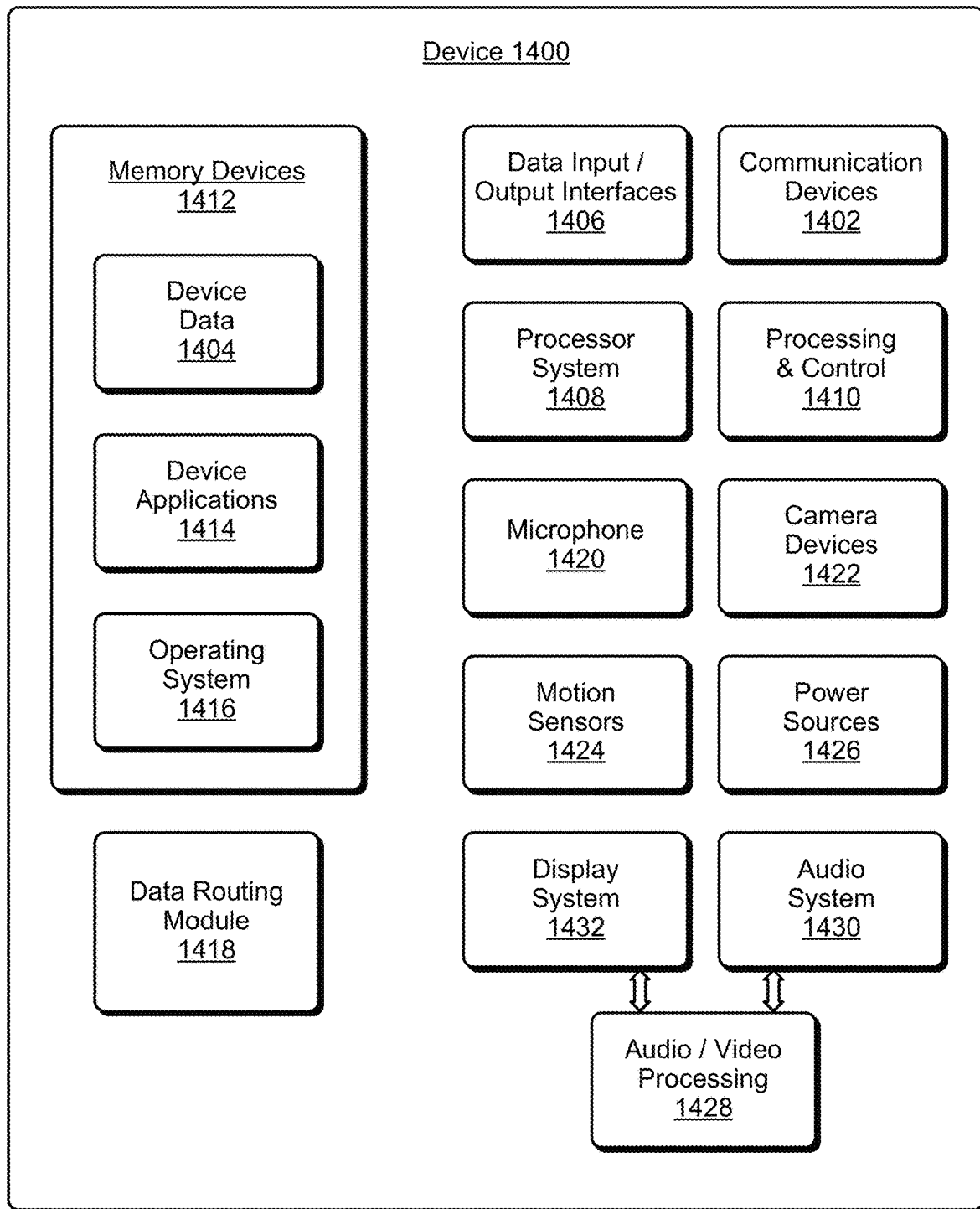
FIG. 14 illustrates various components of an example device that can implement aspects of data routing based on application restriction designation.

FIG. 14 illustrates various components of an example device 1400 in which aspects of data routing based on application restriction designation can be implemented. The example device 1400 can be implemented as any of the devices described with reference to the previous FIGS. 1-13, such as any type of mobile device, mobile phone, mobile device, wearable device, tablet, computing, communication, entertainment, gaming, media playback, and/or other type of electronic device. For example, the computing device 102, the mobile device 104, and/or the mobile device 702 as shown and described with reference to FIGS. 1-13 may be implemented as the example device 1400.

The example device 1400 can include various, different communication devices 1402 that enable wired and/or wireless communication of device data 1404 with other devices. The device data 1404 can include any of the various devices data and content that is generated, processed, determined, received, stored, and/or communicated from one computing device to another. Generally, the device data 1404 can include any form of audio, video, image, graphics, and/or electronic data that is generated by applications executing on a device. The communication devices 1402 can also include transceivers for cellular phone communication and/or for any type of network data communication.

The example device 1400 can also include various, different types of data input/output (I/O) interfaces 1406, such as data network interfaces that provide connection and/or communication links between the devices, data networks, and other devices. The I/O interfaces 1406 can be used to couple the device to any type of components, peripherals, and/or accessory devices, such as a computer input device that may be integrated with the example device 1400. The I/O interfaces 1406 may also include data input ports via which any type of data, information, media content, communications, messages, and/or inputs can be received, such as user inputs to the device, as well as any type of audio, video, image, graphics, and/or electronic data received from any content and/or data source.

The example device 1400 includes a processor system 1408 of one or more processors (e.g., any of microprocessors, controllers, and the like) and/or a processor and memory system implemented as a system-on-chip (SoC) that processes computer-executable instructions. The processor system 1408 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 1410. The example device 1400 may also include any type of a system bus or other data and command transfer system that couples the various components within the device. A system bus can include any one or combination of different bus structures and architectures, as well as control and data lines.

The example device 1400 also includes memory and/or memory devices 1412 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 1412 include volatile memory and non-volatile memory, fixed and removable media devices, and any suitable memory device or electronic data storage that maintains data for computing device access. The memory devices 1412 can include various implementations of random-access memory (RAM), read-only memory (ROM), flash memory, and other types of storage media in various memory device configurations. The example device 1400 may also include a mass storage media device.

The memory devices 1412 (e.g., as computer-readable storage memory) provide data storage mechanisms, such as to store the device data 1404, other types of information and/or electronic data, and various device applications 1414 (e.g., software applications and/or modules). For example, an operating system 1416 can be maintained as software instructions with a memory device 1412 and executed by the processor system 1408 as a software application. The device applications 1414 may also include a device manager, such as any form of a control application, software application, signal-processing and control module, code that is specific to a particular device, a hardware abstraction layer for a particular device, and so on.

In this example, the device 1400 includes a data routing module 1418 that implements various aspects of the described features and techniques described herein. The data routing module 1418 can be implemented with hardware components and/or in software as one of the device applications 1414, such as when the example device 1400 is implemented as the computing device 102, the mobile device 104, and/or the mobile device 702 described with reference to FIGS. 1-13. Examples of the data routing module 1418 include the data routing module 124*a* implemented by the computing device 102 communicatively coupled to the mobile device 104, the data routing module 124*b* implemented by the mobile device 104 communicatively coupled to the computing device 102, and the data routing module 716 implemented by the standalone mobile device 702, such as a software application and/or as hardware components in the computing device 102, the mobile device 104, and/or the mobile device 702. In implementations, the data routing module 1418 may include independent processing, memory, and logic components as a computing and/or electronic device integrated with the example device 1400.

The example device 1400 can also include a microphone 1420 and/or camera devices 1422, as well as motion sensors 1424, such as may be implemented as components of an inertial measurement unit (IMU). The motion sensors 1424 can be implemented with various sensors, such as a gyroscope, an accelerometer, and/or other types of motion sensors to sense motion of the device. The motion sensors 1424 can generate sensor data vectors having three-dimensional parameters (e.g., rotational vectors in x, y, and z-axis coordinates) indicating location, position, acceleration, rotational speed, and/or orientation of the device. The example device 1400 can also include one or more power sources 1426, such as when the device is implemented as a computing device and/or a mobile device. The power sources may include a charging and/or power system, and can be implemented as a flexible strip battery, a rechargeable battery, a charged super-capacitor, and/or any other type of active or passive power source.

The example device 1400 can also include an audio and/or video processing system 1428 that generates audio data for an audio system 1430 and/or generates display data for a display system 1432. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1400. Alternatively, the audio system and/or the display system are external, peripheral components to the example device.

Although implementations for data routing based on application restriction designation have been described in language specific to features and/or methods, the appended claims are not necessarily limited to the specific features or methods described. Rather, the specific features and methods are disclosed as example implementations for data routing based on application restriction designation, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a method, comprising: connecting a first data sharing session over an unsecure wireless network for an unrestricted application executing on a computing device, the unrestricted application designated to utilize unsecure network data; detecting a restricted application executing on the computing device, the restricted application designated to utilize secure network data; and connecting a second data sharing session causing a mobile device to provide cellular data to the computing device over a secure cellular network responsive to detecting the restricted application executing on the computing device.

In some aspects, the techniques described herein relate to a method, further comprising automatically designating applications of the computing device as unrestricted applications or restricted applications based on at least one of application metadata of the applications or listing information obtained from download sources associated with the applications.

In some aspects, the techniques described herein relate to a method, further comprising receiving user input designating the unrestricted application and the restricted application.

In some aspects, the techniques described herein relate to a method, further comprising: determining that the unrestricted application and the restricted application are executing on the computing device; and defaulting to the second data sharing session causing the mobile device to provide the cellular data to the computing device over the secure cellular network.

In some aspects, the techniques described herein relate to a method, further comprising: receiving, by the computing device, user input specifying a lenient data sharing preference; and in response to determining an application that is not designated as restricted or unrestricted executing on the computing device, connecting the first data sharing session over the unsecure wireless network based on the lenient data sharing preference.

In some aspects, the techniques described herein relate to a method, further comprising: receiving, by the computing device, user input specifying a conservative data sharing preference; and in response to determining an application that is not designated as restricted or unrestricted executing on the computing device, connecting the second data sharing session causing the mobile device to provide the cellular data to the computing device over the secure cellular network based on the conservative data sharing preference.

In some aspects, the techniques described herein relate to a method, further comprising, in response to detecting that the restricted application is no longer executing on the computing device, disconnecting the second data sharing session causing the mobile device to no longer provide the cellular data to the computing device over the secure cellular network and connecting the first data sharing session over the unsecure wireless network.

In some aspects, the techniques described herein relate to a method, wherein connecting the second data sharing session further includes disconnecting the first data sharing session over the unsecure wireless network.

In some aspects, the techniques described herein relate to a computing device comprising: a memory to maintain application designation data indicating whether applications of the computing device are restricted applications or unrestricted applications; and a data routing module, implemented at least partially in hardware, to: connect a first data sharing session over an unsecure wireless network for execution of an unrestricted application on the computing device, the unrestricted application designated to utilize unsecure network data; detect execution of a restricted application on the computing device, the restricted application designated to utilize secure network data; and connect a second data sharing session to cause a mobile device to provide cellular data to the computing device over a secure cellular network responsive to the execution of the restricted application being detected on the computing device.

In some aspects, the techniques described herein relate to a computing device, wherein the data routing module is implemented to automatically designate the applications of the computing device as the unrestricted applications or the restricted applications based on at least one of application metadata of the applications or listing information obtained from download sources associated with the applications.

In some aspects, the techniques described herein relate to a computing device, wherein the data routing module is implemented to receive user input that designates the unrestricted application and the restricted application.

In some aspects, the techniques described herein relate to a computing device, wherein the data routing module is implemented to: detect execution of the unrestricted application and the restricted application on the computing device; and default to the second data sharing session to cause the mobile device to provide the cellular data to the computing device over the secure cellular network.

In some aspects, the techniques described herein relate to a computing device, wherein the data routing module is implemented to disconnect the second data sharing session to cause the mobile device to no longer provide the cellular data to the computing device over the secure cellular network and connect the first data sharing session over the unsecure wireless network in response to the execution of the restricted application no longer being detected on the computing device.

In some aspects, the techniques described herein relate to a computing device, wherein connection of the second data sharing session further includes disconnection of the first data sharing session over the unsecure wireless network.

In some aspects, the techniques described herein relate to a method comprising: receiving, by a mobile device, network connectivity data indicating a first data sharing session initiated by a computing device over an unsecure wireless network; receiving, by the mobile device, application execution data indicating one or more applications executing on the computing device; and connecting a second data sharing session to provide cellular data to the computing device over a secure cellular network based on the application execution data indicating that a restricted application is executing on the computing device, the restricted application designated to utilize secure network data.

In some aspects, the techniques described herein relate to a method, further comprising disconnecting the second data sharing session to no longer provide the cellular data to the computing device over the secure cellular network based on the application execution data indicating that the restricted application is no longer executing on the computing device.

In some aspects, the techniques described herein relate to a method, further comprising receiving application designation data indicating whether applications of the computing device are restricted applications or unrestricted applications.

In some aspects, the techniques described herein relate to a method, further comprising: receiving, by the mobile device, user input specifying a lenient data sharing preference; and in response to the application execution data indicating an application that is not designated as restricted or unrestricted executing on the computing device, disconnecting the second data sharing session to no longer provide the cellular data to the computing device based on the lenient data sharing preference.

In some aspects, the techniques described herein relate to a method, further comprising: receiving, by the mobile device, user input specifying a conservative data sharing preference; and in response to the application execution data indicating an application that is not designated as restricted or unrestricted executing on the computing device, connecting the second data sharing session to provide the cellular data to the computing device based on the conservative data sharing preference.

In some aspects, the techniques described herein relate to a method, wherein connecting the second data sharing session further includes causing the computing device to disconnect the first data sharing session over the unsecure wireless network.

The invention claimed is:

1. A method, comprising:
    connecting a first data sharing session over an unsecure wireless network for an unrestricted application executing on a computing device, the unrestricted application designated to utilize unsecure network data;
    detecting a restricted application executing on the computing device, the restricted application designated to utilize secure network data; and
    connecting a second data sharing session causing a mobile device to provide cellular data to the computing device over a secure cellular network responsive to detecting the restricted application executing on the computing device.

2. The method as recited in claim 1, further comprising automatically designating applications of the computing device as unrestricted applications or restricted applications based on at least one of application metadata of the applications or listing information obtained from download sources associated with the applications.

3. The method as recited in claim 1, further comprising receiving user input designating the unrestricted application and the restricted application.

4. The method as recited in claim 1, further comprising:
    determining that the unrestricted application and the restricted application are executing on the computing device; and
    defaulting to the second data sharing session causing the mobile device to provide the cellular data to the computing device over the secure cellular network.

5. The method as recited in claim 1, further comprising:
    receiving, by the computing device, user input specifying a lenient data sharing preference; and
    in response to determining an application that is not designated as restricted or unrestricted executing on the computing device, connecting the first data sharing session over the unsecure wireless network based on the lenient data sharing preference.

6. The method as recited in claim 1, further comprising:
    receiving, by the computing device, user input specifying a conservative data sharing preference; and
    in response to determining an application that is not designated as restricted or unrestricted executing on the computing device, connecting the second data sharing session causing the mobile device to provide the cellular data to the computing device over the secure cellular network based on the conservative data sharing preference.

7. The method as recited in claim 1, further comprising, in response to detecting that the restricted application is no longer executing on the computing device, disconnecting the second data sharing session causing the mobile device to no longer provide the cellular data to the computing device over the secure cellular network and connecting the first data sharing session over the unsecure wireless network.

8. The method as recited in claim 1, wherein connecting the second data sharing session further includes disconnecting the first data sharing session over the unsecure wireless network.

9. A computing device comprising:
    a memory to maintain application designation data indicating whether applications of the computing device are restricted applications or unrestricted applications; and
    a data routing module, implemented at least partially in hardware, to:
        connect a first data sharing session over an unsecure wireless network for execution of an unrestricted application on the computing device, the unrestricted application designated to utilize unsecure network data;
        detect execution of a restricted application on the computing device, the restricted application designated to utilize secure network data; and
        connect a second data sharing session to cause a mobile device to provide cellular data to the computing device over a secure cellular network responsive to the execution of the restricted application being detected on the computing device.

10. The computing device of claim 9, wherein the data routing module is implemented to automatically designate the applications of the computing device as the unrestricted applications or the restricted applications based on at least one of application metadata of the applications or listing information obtained from download sources associated with the applications.

11. The computing device of claim 9, wherein the data routing module is implemented to receive user input that designates the unrestricted application and the restricted application.

12. The computing device of claim 9, wherein the data routing module is implemented to:
    detect execution of the unrestricted application and the restricted application on the computing device; and
    default to the second data sharing session to cause the mobile device to provide the cellular data to the computing device over the secure cellular network.

13. The computing device of claim 9, wherein the data routing module is implemented to disconnect the second data sharing session to cause the mobile device to no longer provide the cellular data to the computing device over the secure cellular network and connect the first data sharing session over the unsecure wireless network in response to the execution of the restricted application no longer being detected on the computing device.

14. The computing device of claim 9, wherein connection of the second data sharing session further includes disconnection of the first data sharing session over the unsecure wireless network.

15. A method comprising:
    receiving, by a mobile device, network connectivity data indicating a first data sharing session initiated by a computing device over an unsecure wireless network;

receiving, by the mobile device, application execution data indicating one or more applications executing on the computing device; and connecting a second data sharing session to provide cellular data to the computing device over a secure cellular network based on the application execution data indicating that a restricted application is executing on the computing device, the restricted application designated to utilize secure network data.

16. The method as recited in claim 15, further comprising disconnecting the second data sharing session to no longer provide the cellular data to the computing device over the secure cellular network based on the application execution data indicating that the restricted application is no longer executing on the computing device.

17. The method as recited in claim 15, further comprising receiving application designation data indicating whether applications of the computing device are restricted applications or unrestricted applications.

18. The method as recited in claim 15, further comprising:

receiving, by the mobile device, user input specifying a lenient data sharing preference; and in response to the application execution data indicating an application that is not designated as restricted or unrestricted executing on the computing device, disconnecting the second data sharing session to no longer provide the cellular data to the computing device based on the lenient data sharing preference.

19. The method as recited in claim 15, further comprising:

receiving, by the mobile device, user input specifying a conservative data sharing preference; and in response to the application execution data indicating an application that is not designated as restricted or unrestricted executing on the computing device, connecting the second data sharing session to provide the cellular data to the computing device based on the conservative data sharing preference.

20. The method as recited in claim 15, wherein connecting the second data sharing session further includes causing the computing device to disconnect the first data sharing session over the unsecure wireless network.

* * * * *